(12) United States Patent
Gao et al.

(10) Patent No.: US 9,753,286 B2
(45) Date of Patent: Sep. 5, 2017

(54) ERGONOMIC HEAD MOUNTED DISPLAY DEVICE AND OPTICAL SYSTEM

(71) Applicant: Magic Leap, Inc., Plantation, FL (US)

(72) Inventors: Chunyu Gao, Tucson, AZ (US); Hong Hua, Tucson, AZ (US); Yuxiang Lin, Tucson, AZ (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 14/991,810

(22) Filed: Jan. 8, 2016

(65) Prior Publication Data

US 2016/0154245 A1    Jun. 2, 2016

Related U.S. Application Data

(62) Division of application No. 13/335,884, filed on Dec. 22, 2011, now Pat. No. 9,348,143.

(Continued)

(51) Int. Cl.
*G02B 27/01*    (2006.01)
*F21V 8/00*    (2006.01)
(Continued)

(52) U.S. Cl.
CPC ......... *G02B 27/0172* (2013.01); *G02B 6/003* (2013.01); *G02B 27/0176* (2013.01);
(Continued)

(58) Field of Classification Search
None
See application file for complete search history.

(56) References Cited

U.S. PATENT DOCUMENTS 5,699,194 A    12/1997    Takahashi
5,701,202 A    12/1997    Takahashi
(Continued)

FOREIGN PATENT DOCUMENTS

EP    1089111 A1    4/2011
JP    10-307276    11/1998
(Continued)

OTHER PUBLICATIONS

Extended European Search Report mailed on Jun. 23, 2016, European Patent Application No. 11850243.4, (9 Pages).
(Continued)

*Primary Examiner* — Mike Stahl
(74) *Attorney, Agent, or Firm* — David C. Lundmark

(57) ABSTRACT

This invention concerns an ergonomic optical see-through head mounted display device with an eyeglass appearance. The see-through head-mounted display device consists of a transparent, freeform waveguide prism for viewing a displayed virtual image, a see-through compensation lens for enabling proper viewing of a real-world scene when combined together with the prism, and a miniature image display unit for supplying display content. The freeform waveguide prism, containing multiple freeform refractive, and reflective surfaces, guides light originated from the miniature display unit toward a user's pupil and enables a user to view a magnified image of the displayed content. A see-through compensation lens, containing multiple freeform refractive surfaces, enables proper viewing of the surrounding environment, through the combined waveguide and lens. The waveguide prism and the see-through compensation lens are properly designed to ergonomically fit human heads enabling a wraparound design of a lightweight, compact, and see-through display system.

8 Claims, 39 Drawing Sheets

Related U.S. Application Data

(60) Provisional application No. 61/427,162, filed on Dec. 24, 2010.

(51) Int. Cl.
*G02B 27/28* (2006.01)
*G02B 5/30* (2006.01)

(52) U.S. Cl.
CPC .............. *G02B 27/283* (2013.01); *G02B 5/30* (2013.01); *G02B 2027/011* (2013.01); *G02B 2027/013* (2013.01); *G02B 2027/0123* (2013.01); *G02B 2027/0178* (2013.01)

(56) References Cited

U.S. PATENT DOCUMENTS

| | | | |
|---|---|---|---|
| 5,706,136 | A | 1/1998 | Okuyama et al. |
| 5,745,295 | A | 4/1998 | Takahashi |
| 5,886,824 | A | 3/1999 | Takahashi |
| 5,909,317 | A | 6/1999 | Nakaoka et al. |
| 5,909,325 | A * | 6/1999 | Kuba ............... G02B 27/0172 359/633 |
| 5,959,780 | A | 9/1999 | Togino et al. |
| 5,986,812 | A | 11/1999 | Takahashi |
| 6,023,373 | A | 2/2000 | Inoguchi et al. |
| 6,028,709 | A | 2/2000 | Takahashi |
| 6,034,823 | A | 3/2000 | Togino |
| 6,046,857 | A | 4/2000 | Morishima |
| 6,181,475 | B1 | 1/2001 | Togino et al. |
| 6,201,646 | B1 | 3/2001 | Togino et al. |
| 6,384,983 | B1 * | 5/2002 | Yamazaki ......... G02B 27/0172 345/8 |
| 6,396,639 | B1 | 5/2002 | Togino et al. |
| 6,646,812 | B2 | 11/2003 | Togino |
| 6,653,989 | B2 | 11/2003 | Nakanishi |
| 6,760,169 | B2 | 7/2004 | Takahashi et al. |
| 6,977,776 | B2 | 12/2005 | Volkenandt |
| 7,262,890 | B2 | 8/2007 | Amanai |
| 2002/0034016 | A1 | 3/2002 | Inoguchi et al. |
| 2002/0105737 | A1 | 8/2002 | Takahashi et al. |
| 2003/0086135 | A1 | 5/2003 | Takeyama |
| 2003/0107816 | A1 | 6/2003 | Takagi et al. |
| 2004/0085649 | A1 | 5/2004 | Repetto et al. |
| 2005/0254107 | A1 | 11/2005 | Amanai |
| 2006/0072205 | A1 | 4/2006 | Li et al. |
| 2007/0064310 | A1 | 3/2007 | Mukawa et al. |
| 2008/0062537 | A1 | 3/2008 | Liao |
| 2010/0171922 | A1 | 7/2010 | Sessner et al. |
| 2011/0194163 | A1 * | 8/2011 | Shimizu ............ G02B 5/32 359/15 |
| 2011/0213664 | A1 | 9/2011 | Osterhout et al. |
| 2011/0214082 | A1 | 9/2011 | Osterhout et al. |
| 2011/0221656 | A1 | 9/2011 | Haddick et al. |
| 2011/0221657 | A1 | 9/2011 | Haddick et al. |
| 2011/0221658 | A1 | 9/2011 | Haddick |
| 2011/0221659 | A1 | 9/2011 | King, III et al. |
| 2011/0221668 | A1 | 9/2011 | Haddick et al. |
| 2011/0221669 | A1 | 9/2011 | Shams et al. |
| 2011/0221670 | A1 | 9/2011 | King, III |
| 2011/0221671 | A1 | 9/2011 | King, III |
| 2011/0221672 | A1 | 9/2011 | Osterhout et al. |
| 2011/0221793 | A1 | 9/2011 | King, III |
| 2011/0221896 | A1 | 9/2011 | Haddick et al. |
| 2011/0221897 | A1 | 9/2011 | Haddick et al. |
| 2011/0222745 | A1 | 9/2011 | Osterhout |
| 2011/0225536 | A1 | 9/2011 | Shams et al. |
| 2011/0227812 | A1 | 9/2011 | Haddick et al. |
| 2011/0227813 | A1 | 9/2011 | Haddick et al. |
| 2011/0227820 | A1 | 9/2011 | Haddick et al. |
| 2011/0231757 | A1 | 9/2011 | Haddick et al. |
| 2012/0081800 | A1 | 4/2012 | Cheng et al. |
| 2013/0250207 | A1 * | 9/2013 | Bohn ................. G02B 6/00 349/61 |
| 2014/0071539 | A1 | 3/2014 | Gao |
| 2014/0139403 | A1 | 5/2014 | Hiraide |
| 2014/0160576 | A1 * | 6/2014 | Robbins ............ G02B 27/0172 359/630 |
| 2014/0293434 | A1 | 10/2014 | Cheng |

FOREIGN PATENT DOCUMENTS

| | | |
|---|---|---|
| JP | 2001-13446 | 1/2001 |
| JP | 2001-330794 A | 11/2001 |
| JP | 2002-162598 | 6/2002 |
| JP | 2002-311379 | 10/2002 |
| JP | 2005-202060 | 7/2005 |
| JP | 2006-153967 A | 5/2006 |
| JP | 2010-517090 A | 5/2010 |
| WO | 2008/090000 A1 | 7/2008 |
| WO | 2010/123934 A1 | 10/2010 |

OTHER PUBLICATIONS

Office Action dated Sep. 17, 2015 and mailed on Sep. 24, 2015 (with English Translation), Japanese Patent No. 2013-546440, (22 pages).

Cheng, D. et al., "Design of an optical see-through head-mounted display with a low f-number and large field of view using a freeform prism", Applied Optics, 48(14), May 10, 2009, pp. 2655-2668.

Hua, et al., "A Polorized Head-Mounted Projective Display; Proceedings of the International Symposium on Mixed and Augmented Reality", ISMAR'05, [retrieved on Apr. 20, 2012]; retrieved from Internet: <URL:http://ieeexplore.ieee.orgstamp/stmap.jsp?tp=&arnumber=1544660>, 2005, (4 pages).

Rolland, Jannick P., "Wide-angle, off-axis, see through head-mounted display", Optical Engineering vol. 39 No. 7, [retrieved on Apr. 20, 2012]; retrieved from the internet: <URL:http://www.creol.uctedu/Research/Publications/1378. PDF>, Jul. 2000, pp. 1760-1767.

Second Office Action Dated Feb. 19, 2016 (English Translation), Chinese Application No. 2011800684477., (6 Pages).

Japanese Office Action dated Aug. 30, 2016 and mailed on Sep. 2, 2016 (with English Translation), Japanese Patent Application No. 2013-546440, (9 pages).

* cited by examiner

Table 1: Mathematic equations of selected freeform surfaces

Asphere (ASP)

$$z = \frac{ch^2}{1+\sqrt{1-(1+k)c^2h^2}} + Ah^4 + Bh^6 + Ch^8 + Dh^{10} + Eh^{12} + Fh^{14} + Gh^{16} + Hh^{18} + Jh^{20}$$

Where: $h^2 = x^2 + y^2$
z: the sag of the surface parallel to the z-axis
c: the curvature at the pole of the surface (CUY)

Anamorphic Asphere (AAS)

$$z = \frac{CUX x^2 + CUY y^2}{1+\sqrt{1-(1+KX)CUX^2 x^2 - (1+KY)CUY^2 y^2}}$$
$$+ AR\{(1-AP)x^2 + (1+AP)y^2\}^2 + BR\{(1-BP)x^2 + (1+BP)y^2\}^3$$
$$+ CR\{(1-CP)x^2 + (1+CP)y^2\}^4 + DR\{(1-DP)x^2 + (1+DP)y^2\}^5$$

Where:
z: the sag of the surface parallel to the z-axis
CUX, CUY: the curvature at the pole of the surface

XY Polynomial (XYP)

$$z = \frac{cr^2}{1+\sqrt{1-(1+k)c^2 r^2}} + \sum_{j=2}^{66} C_j x^m y^n, \quad j = \frac{(m+n)^2 + m + 3n}{2} + 1$$

Where: $r^2 = x^2 + y^2$
z: the sag of the surface parallel to the z-axis
c: the curvature at the pole of the surface

Figure 24

Table 2: Surface parameters for waveguide prism of Embodiment 5 shown in Figure 8

| Surface 1 (S1) | | | | Surface type | | Anamorphic Asphere | |
|---|---|---|---|---|---|---|---|
| CUX | -9.9070E-03 | CUY | -1.1676E-02 | KX | 9.4314E+00 | KY | 3.1929E+00 |
| AR | -1.8562E-22 | BR | 1.4920E-09 | CR | -7.4501E-16 | DR | -9.6512E-15 |
| AP | 2.3081E+08 | BP | 1.2807E+00 | CP | -9.1631E+00 | DP | 8.1010E-02 |
| Surface 2 (S2) | | | | Surface type | | Anamorphic Asphere | |
| CUX | -1.7817E-02 | CUY | -3.6309E-02 | KX | -9.5418E+00 | KY | -2.7238E+00 |
| AR | -4.2565E-06 | BR | -5.5852E-09 | CR | 1.9081E-12 | DR | -1.4883E-16 |
| AP | -4.6626E-01 | BP | 5.7739E-01 | CP | 8.7723E-01 | DP | 1.2407E+00 |
| Surface 3 (S3) | | | | Surface type | | Anamorphic Asphere | |
| CUX | -8.3678E-02 | CUY | -6.7211E-02 | KX | -9.0166E-01 | KY | -8.6436E-01 |
| AR | -8.6010E-12 | BR | 2.1446E-08 | CR | -3.5831E-11 | DR | 2.1276E-14 |
| AP | -1.4153E+03 | BP | 4.3066E-01 | CP | 7.2541E-02 | DP | -8.8899E-02 |
| Surface 4 (S4) | | | | Surface type | | Anamorphic Asphere | |
| CUX | -4.2336E-02 | CUY | -4.6394E-02 | KX | -3.0298E-01 | KY | -4.5085E-01 |
| AR | -2.5784E-05 | BR | 1.7678E-08 | CR | 4.0315E-11 | DR | -8.5528E-14 |
| AP | -4.8389E-01 | BP | -3.4146E-01 | CP | -1.5577E-01 | DP | -2.7360E-01 |

Figure 25

Table 3: Surface parameters for coupling lens and field lens of Embodiment 5 shown in Figure 8

| Coupling Lens: Surface 5 (S5) | | | | Surface type | | Asphere | |
|---|---|---|---|---|---|---|---|
| CUY | -1.3459E-01 | k | -6.9807E-01 | A | -1.3616E-05 | B | 4.1042E-06 |
| C | -1.2137E-07 | D | 7.7966E-10 | E | 0 | F~J | 0 |
| Coupling lens: Surface 6 (S6) | | | | Surface type | | Asphere | |
| CUY | 3.1575E-02 | k | 7.8412E+00 | A | -5.5351E-04 | B | 6.7729E-06 |
| C | -1.7918E-07 | D | 2.0258E-09 | E | 0 | F~J | 0 |
| Field Lens: Surface 9 (S9) | | | | Surface type | | Asphere | |
| CUY | -9.3316E-02 | k | 3.1134E+00 | A | 3.6843E-04 | B | 7.3317E-05 |
| C | -5.4836E-06 | D | 1.4474E-07 | E | 1.0195E-09 | F~J | 0 |
| Field lens: Surface 10 (S10) | | | | Surface type | | Asphere | |
| CUY | -2.2371E+07 | k | -9.9000E+01 | A | 7.7779E-03 | B | -5.9340E-04 |
| C | 1.7957E-05 | D | -1.2217E-07 | E | -1.1803E-09 | F~J | 0 |

Figure 26

Table 4: Position and orientation parameters of the optical surfaces in Embodiment 5 shown in Figure 8

| Elements | Material | Surface | Reference | Position of the surface in its Reference Coordinate | | | Orientation |
|---|---|---|---|---|---|---|---|
| | | | | X(mm) | Y(mm) | Z(mm) | RX(Degree) |
| Exit Pupil | | | Global Coordinates (GC) | | | | |
| Waveguide Prism | ZEONEX Z-E48R | S1 | GC | 0 | -11.0363 | 19.6399 | 2.6869 |
| | | S2 | GC | 0 | -8.2081 | 21.8522 | -32.1373 |
| | | S3 | GC | 0 | -12.2730 | 19.2367 | -32.9064 |
| | | S4 | GC | 0 | 13.1282 | 21.5151 | -19.2902 |
| Reference Plane 1 (RP1) | | | GC | 0 | 38.2880 | 3.2653 | -11.1865 |
| Coupling lens | ZEONEX Z-E48R | S5 | RP1 | 0 | 0 | 0 | 0 |
| | | S6 | RP1 | 0 | 0 | -7.5003 | 0 |
| Reference Plane 2 (RP2) | | | RP1 | 0 | 1.5125 | -9.2347 | 14.4064 |
| Beamsplitter | NSK5 | S7 | RP2 | 0 | 0 | 0 | 0 |
| | | S8 | RP2 | 0 | 0 | -6 | 0 |
| Field Lens | Acrylic | S9 | RP2 | 0 | 0 | -6.1001 | 0 |
| | | S10 | RP2 | 0 | 0 | -10.1373 | 0 |
| Display Panel | BK7 | S11 | RP2 | 0 | 0 | -10.3079 | 0 |
| | | S12 | RP2 | 0 | 0 | -11.0079 | 0 |
| Notes: The orientations of the surface related to Y and Z axis are zeros. | | | | | | | |

Figure 27

Table 5: Surface parameters for waveguide prism of Embodiment 6 shown in Figure 9

| Surface 1 (S1) | | | | Surface type | | Anamorphic Asphere | |
|---|---|---|---|---|---|---|---|
| CUX | -1.7235E-02 | CUY | -8.0522E-02 | KX | -6.2043E+00 | KY | -1.9292E+00 |
| AR | 1.6659E-10 | BR | -1.9810E-08 | CR | 1.2890E-10 | DR | -2.9913E-13 |
| AP | 4.7650E+01 | BP | -3.6862E-01 | CP | -4.0211E-01 | DP | -4.7752E-01 |
| Surface 2 (S2) | | | | Surface type | | Anamorphic Asphere | |
| CUX | -2.2830E-02 | CUY | -3.3747E-02 | KX | 1.0157E+00 | KY | -9.8663E-01 |
| AR | 2.4850E-06 | BR | -1.1543E-09 | CR | 1.2081E-13 | DR | -2.7016E-17 |
| AP | 3.5728E+00 | BP | 4.5196E-01 | CP | 8.3224E-01 | DP | 5.4078E-01 |
| Surface 3 (S3) | | | | Surface type | | Anamorphic Asphere | |
| CUX | -4.4254E-02 | CUY | -3.4563E-02 | KX | -2.3146E-02 | KY | 2.8158E-01 |
| AR | 1.1073E-07 | BR | 2.5504E-08 | CR | -5.9230E-11 | DR | 1.0021E-13 |
| AP | 3.8494E+00 | BP | 4.8881E-01 | CP | 4.1804E-01 | DP | 1.9104E-01 |
| Surface 4 (S4) | | | | Surface type | | Anamorphic Asphere | |
| CUX | -3.9787E-02 | CUY | -2.5414E-02 | KX | -4.7026E-01 | KY | -3.3724E-01 |
| AR | 3.9861E-06 | BR | -1.0080E-09 | CR | 9.5396E-14 | DR | 1.3866E-18 |
| AP | 5.0631E-01 | BP | 6.2702E-01 | CP | 7.5860E-01 | DP | -2.6712E+00 |

Figure 28

Table 6: Surface parameters for coupling lens and field lens of Embodiment 6 shown in Figure 9

| Coupling Lens: Surface 5 (S5) | | | | | | Surface type | | Asphere | |
|---|---|---|---|---|---|---|---|---|---|
| CUY | -5.1588E-02 | k | 2.3815E+00 | A | 1.6467E-04 | | B | -3.8234E-06 | |
| C | 1.7640E-08 | D | -3.8013E-10 | E | 0 | | F~J | 0 | |
| Coupling lens: Surface 6 (S6) | | | | | | Surface type | | Asphere | |
| CUY | 6.5629E-02 | k | -1.7928E+00 | A | -8.9627E-05 | | B | -9.4471E-06 | |
| C | 3.2467E-07 | D | -6.2628E-09 | E | 0 | | F~J | 0 | |
| Field Lens: Surface 9 (S9) | | | | | | Surface type | | Asphere | |
| CUY | -1.3590E-01 | k | -1.3642E+00 | A | 1.9923E-05 | | B | -8.5073E-05 | |
| C | 3.8616E-06 | D | -7.9752E-08 | E | 3.9093E-10 | | F~J | 0 | |
| Field lens: Surface 10 (S10) | | | | | | Surface type | | Asphere | |
| CUY | -4.4332E-02 | k | 5.1270E+00 | A | 8.0187E-04 | | B | -2.3761E-04 | |
| C | 1.0417E-05 | D | -3.8831E-08 | E | -2.3806E-09 | | F~J | 0 | |

Figure 29

Table 7: Position and orientation parameters of the optical surfaces in Embodiment 6 shown in Figure 9

| Elements | Material | Surface | Reference | Position of the surface in its Reference Coordinate | | | Orientation |
|---|---|---|---|---|---|---|---|
| | | | | X(mm) | Y(mm) | Z(mm) | RX(Degree) |
| Exit Pupil | | | Global Coordinates (GC) | | | | |
| Waveguide Prism | ZEONEX Z-E48R | S1 | GC | 0 | -10.3905 | 16.8794 | -28.3059 |
| | | S2 | GC | 0 | -10.7798 | 17.8538 | -40.091 |
| | | S3 | GC | 0 | 23.4106 | 15.9395 | -21.0988 |
| | | S4 | GC | 0 | -1.7474 | 21.053 | -25.1808 |
| Reference Plane 1 (RP1) | | | GC | 0 | 42.9447 | 14.7784 | 9.5813 |
| Coupling lens | ZEONEX Z-E48R | S5 | RP1 | 0 | 0 | 0 | 0 |
| | | S6 | RP1 | 0 | 0 | -6.7170 | 0 |
| Reference Plane 2 (RP2) | | | RP1 | 0 | 4.2011 | -10.2692 | -15.2180 |
| Beamsplitter | NSK5 | S7 | RP2 | 0 | 0 | 0 | 0 |
| | | S8 | RP2 | 0 | 0 | -6 | 0 |
| Field Lens | Acrylic | S9 | RP2 | 0 | 0 | -6.1031 | 0 |
| | | S10 | RP2 | 0 | 0 | -8.8281 | 0 |
| Display Panel | BK7 | S11 | RP2 | 0 | 0 | -10.3569 | 0 |
| | | S12 | RP2 | 0 | 0 | -11.057 | 0 |

Notes: The orientations of the surface related to Y and Z axis are zeros.

Figure 30

Table 8: Surface parameters for waveguide prism of Embodiment 7 shown in Figure 10

| Surface 1 (S1) | | | | Surface type | | Anamorphic Asphere | |
|---|---|---|---|---|---|---|---|
| CUX | -1.9231E-02 | CUY | -8.3075E-03 | KX | -8.4219E+00 | KY | -7.7451E-01 |
| AR | -6.2368E-07 | BR | -2.4549E-10 | CR | -1.7581E-14 | DR | 1.7890E-16 |
| AP | -2.4470E+00 | BP | 1.0571E+00 | CP | -4.3114E+00 | DP | 6.6528E-01 |
| Surface 2 (S2) | | | | Surface type | | Anamorphic Asphere | |
| CUX | -2.9836E-02 | CUY | -3.7501E-02 | KX | -3.0500E+00 | KY | -4.0091E+00 |
| AR | -7.3779E-06 | BR | -4.5899E-09 | CR | 1.1266E-11 | DR | -3.7653E-15 |
| AP | 2.7532E-01 | BP | -6.8098E-01 | CP | -1.7624E-01 | DP | 1.8127E-01 |
| Surface 3 (S3) | | | | Surface type | | Anamorphic Asphere | |
| CUX | 9.0273E-02 | CUY | 6.9550E-02 | KX | -2.0357E+00 | KY | -8.0971E+00 |
| AR | 3.4993E-05 | BR | -5.0062E-09 | CR | 1.0413E-13 | DR | -6.0904E-11 |
| AP | -2.2294E-01 | BP | 2.5605E+00 | CP | -9.8314E+00 | DP | -3.3273E-01 |

Figure 31

Table 9: Surface parameters for coupling lens and field lens of Embodiment 7 shown in Figure 10

| Coupling Lens: Surface 4 (S4) | | | | Surface Type | | Asphere | |
|---|---|---|---|---|---|---|---|
| CUY | -4.4599E-02 | k | -5.7676E+00 | A | 2.6802E-04 | B | 1.1219E-05 |
| C | -3.5542E-07 | D | 1.3081E-08 | E | -1.9737E-12 | F~J | 0 |
| Coupling lens: Surface 5 (S5) | | | | Surface Type | | Asphere | |
| CUY | 1.2479E-01 | k | -7.7195E-01 | A | -1.7126E-04 | B | 1.4278E-05 |
| C | -3.3152E-07 | D | 4.4825E-09 | E | -2.0769E-11 | F~J | 0 |
| Coupling lens: Surface 5 (S5) | | | | Surface Type | | DOE Phase Polynomial | |
| Order | -1 | Wavelength | 525 | C1 | 1.6365E-03 | C2 | 8.4113E-05 |
| C3 | -6.1888E-06 | C4 | 1.9873E-07 | C5 | -2.8832E-09 | C6 | 1.5415E-11 |
| Field Lens: Surface 6 (S6) | | | | Surface Type | | Asphere | |
| CUY | -7.4721E-02 | k | -5.9647E+00 | A | -8.5364E-04 | B | 9.8825E-06 |
| C | -1.8165E-07 | D | 2.3531E-09 | E | 1.0278E-10 | F~J | 0 |
| Field lens: Surface 7 (S7) | | | | Surface Type | | Asphere | |
| CUY | 4.7980E-03 | k | -1.5000E+01 | A | -4.6428E-03 | B | 3.1397E-04 |
| C | -5.8421E-06 | D | 2.2878E-08 | E | 2.3586E-10 | F~J | 0 |

Notes:
1. Higher order diffraction coefficients which are not listed in the table are all zeros.
2. The DOE on the surface 5 of the coupling lens is rotationally symmetric kinoform. The phase profile (in radians) is given by $\phi = (\frac{2\pi}{\lambda}) \sum C_n r^{2n}$

Figure 32

Table 10: Position and orientation parameters of the optical surfaces in Embodiment 7 shown in Figure 10

| Elements | Material | Surface | Reference | Position of the surface in its Reference Coordinate | | | Orientation |
|---|---|---|---|---|---|---|---|
| | | | | X(mm) | Y(mm) | Z(mm) | RX(Degree) |
| Exit Pupil | | | Global Coordinates (GC) | | | | |
| Waveguide Prism | ZEONEX Z-E48R | S1 | GC | 0 | -14.1691 | 18.4553 | -1.6149 |
| | | S2 | GC | 0 | -13.7000 | 15.7808 | -49.7837 |
| | | S3 | GC | 0 | 30.6505 | 8.2168 | -28.1851 |
| Reference Plane 1 (RP1) | | | GC | 0 | 34.1937 | 7.7324 | -15.7133 |
| Coupling lens | ZEONEX Z-E48R | S4 | RP1 | 0 | 0 | 0 | 0 |
| | | S5 | RP1 | 0 | 0 | -8.8871 | 0 |
| Reference Plane 2 (RP2) | | | RP1 | 0 | -0.099 | -10.2542 | -15 |
| Field Lens | Acrylic | S6 | RP2 | 0 | 0 | -6.3901 | 0 |
| | | S7 | RP2 | 0 | 0 | -12.8901 | 0 |
| Display Panel | Eagle2K | S8 | RP2 | 0 | 0 | -13.6564 | 0 |
| | | S9 | RP2 | 0 | 0 | -14.3564 | 0 |

Notes: The orientations of the surface related to Y and Z axis are zeros.

Figure 33

Table 11: Surface parameters for compensation lens of Embodiment 7 shown in Figure 10

| Surface 1 (S1) | | | | Surface type | | Anamorphic Asphere | |
|---|---|---|---|---|---|---|---|
| CUX | -1.9231E-02 | CUY | -8.3075E-03 | KX | -8.4219E+00 | KY | -7.7451E-01 |
| AR | -6.2368E-07 | BR | -2.4549E-10 | CR | -1.7581E-14 | DR | 1.7890E-16 |
| AP | -2.4470E+00 | BP | 1.0571E+00 | CP | -4.3114E+00 | DP | 6.6528E-01 |
| Surface 2 (S2) | | | | Surface type | | Anamorphic Asphere | |
| CUX | -2.9836E-02 | CUY | -3.7501E-02 | KX | -3.0500E+00 | KY | -4.0091E+00 |
| AR | -7.3779E-06 | BR | -4.5899E-09 | CR | 1.1266E-11 | DR | -3.7653E-15 |
| AP | 2.7532E-01 | BP | -6.8098E-01 | CP | -1.7624E-01 | DP | 1.8127E-01 |
| Surface 3 (S3) | | | | Surface type | | XY Polynomial | |
| CUY | 0.0000E+00 | k | 0.0000E+00 | $C_3$ | -1.2817E-02 | $C_4$ | -6.5766E-03 |
| $C_6$ | -6.6877E-03 | $C_8$ | 1.7801E-04 | $C_{10}$ | -1.1495E-04 | $C_{11}$ | -6.6095E-07 |
| $C_{13}$ | 3.2342E-06 | $C_{15}$ | -5.0261E-06 | $C_{17}$ | -7.2570E-08 | $C_{19}$ | 2.5353E-07 |
| $C_{21}$ | -9.0306E-08 | $C_{22}$ | -7.3099E-09 | $C_{24}$ | -8.6631E-09 | $C_{26}$ | 2.0620E-08 |
| $C_{28}$ | 9.8628E-09 | $C_{30}$ | 1.2596E-10 | $C_{32}$ | -5.6559E-10 | $C_{34}$ | -5.2907E-11 |
| $C_{36}$ | 2.5383E-10 | $C_{37}$ | 1.7033E-11 | $C_{39}$ | 3.6988E-11 | $C_{41}$ | 1.4774E-11 |
| $C_{43}$ | -4.2625E-11 | $C_{45}$ | -1.6603E-11 | $C_{47}$ | -1.3883E-13 | $C_{49}$ | 9.0662E-14 |
| $C_{51}$ | 4.5540E-13 | $C_{53}$ | 2.9772E-13 | $C_{55}$ | -2.2173E-13 | $C_{56}$ | -1.4173E-14 |
| $C_{58}$ | -3.9507E-14 | $C_{60}$ | -4.1590E-14 | $C_{62}$ | -4.1883E-15 | $C_{64}$ | 5.3842E-14 |
| $C_{66}$ | 1.1332E-14 | others | 0.0000E+00 | | | | |

Figure 34

Table 12: Position and orientation parameters of the compensation lens of Embodiment 7 shown in Figure 10

| Elements | Material | Surface | Reference | Position of the surface in its Reference Coordinate | | | Orientation |
|---|---|---|---|---|---|---|---|
| | | | | X(mm) | Y(mm) | Z(mm) | RX(Degree) |
| Exit Pupil | | | Global Coordinates (GC) | | | | |
| Compensation lens | Z-E48R | S1 | GC | 0 | -14.1691 | 18.4553 | -1.6149 |
| | | S2 | GC | 0 | -13.7000 | 15.8808 | -49.7837 |
| | | S3 | GC | 0 | 1.7401 | 32.9890 | 6.5893 |
| Notes: The orientations of the surface related to Y and Z axis are zeros. | | | | | | | |

Figure 35

ERGONOMIC HEAD MOUNTED DISPLAY DEVICE AND OPTICAL SYSTEM

CROSS REFERENCE

This application claims priority to U.S. provisional application Ser. No. 61/427,162 filed Dec. 24, 2010, the specification of which is incorporated herein by reference in its entirety.

BACKGROUND OF THE INVENTION

The present invention relates generally to an optical see-through head-mounted display (OST-HMD) device, and more particularly, to ergonomically designed freeform optical systems for use as an optical viewing device in optical see-through HMDs with an eyeglass-form appearance and a wide see-through field of view (FOV).

Head-mounted displays (HMD) have long been proven invaluable for many applications, spanning the fields of scientific visualization, medicine and military training, engineering design and prototyping, tele-manipulation and tele-presence, and personal entertainment systems. In mixed and augmented reality systems, optical see-through HMDs are one of the basic approaches to combining computer-generated virtual scene with the views of a real-world scene. Typically through an optical combiner, an OST-HMD optically overlays computer-generated images onto the real-world view while maintaining a direct, minimally-degraded view of the real world. An OST-HMD has a great potential for creating a mobile display solution that offers much more attractive image quality and screen site than other popular mobile platforms such as smart phones and PDAs.

On the other hand, despite much significant advancement on HMD designs over the past decades, there exist many technical and usability barriers preventing the technology from being widely accepted for many demanding applications and daily usage. One of the major barriers with HMDs is the cumbersome, helmet-like form factor' that prevents the acceptance of the technology for many demanding and emerging applications. Few of the existing optical design methods applied is capable of creating a truly portable, compact, and lightweight HMD design that is nonintrusive and can be considered as being eyeglass-style near-eye displays. Heavy weight contributes to fatigue and discomfort, and is considered a major hindrance of HMD-based applications. Additionally, the ability to provide a wide, minimally blocked or degraded see-through FOV is essential for performing daily tasks. In recent year, freeform surfaces have been introduced to HMD system designs [U.S. Pat. Nos. 5,699,194, 5,701,202, 5,706,136. D. Cheng, et al., 'Design of an optical see-through head-mounted display with a low f-number and large field of view using a freeform prism, Applied Optics, 48(14), 2009.] aiming to reduce the system weight and create lightweight HMDs. However, there is still no solution available in today's market which meets both the ergonomic needs and performance needs. Our work aims to develop the solutions with eyeglass form factors and wide see-through FOV, while maintaining a superior performance.

SUMMARY OF THE INVENTION

This invention concerns an ergonomic optical see-through head mounted display (OST-HMD) device with an eyeglass-form appearance and freeform optical systems for use as an optical viewing device in such display devices. The optical viewing device in an OST-HMD typically consists of an optical path for viewing a displayed virtual image and a see-through path for directly viewing a real-world scene. In the present invention, the virtual image path includes a miniature image display unit for supplying display content and an ergonomically-shaped display viewing optics through which a user views a magnified image of the displayed content. The display viewing optics includes a light guiding device (referred to as a freeform waveguide prism hereafter) containing multiple freeform refractive and reflective surfaces. The display viewing optics may also include additional coupling optics to properly inject light from the image display device into the waveguide prism. The location and shape of the freeform surfaces and the coupling optics are designed such that a viewer is able to see a clear, magnified image of the displayed content. The see-through path of the head-mounted display device consists of the waveguide prism and a freeform see-through compensation lens attached to an exterior surface of the prism. The see-through compensation lens, containing multiple freeform refractive surfaces, enables proper viewing of the surrounding environment across a very wide see-through field of view. The waveguide prism and the see-through compensation lens are properly designed to ergonomically fit with the ergonomic factors of the human heads enabling a wrap-around design of a lightweight, compact, and see-through display system which has an eyeglass-form appearance, wide see-through field of view, and superior optical performance.

In one of its aspects, the present invention provides various embodiments of freeform optical systems for use as an optical viewing device in an ergonomic head mounted display device. The freeform optical systems in the present invention are optimized to provide ergonomically shaped viewing optics that fit with the ergonomic factors of the human head, allowing them to be wrapped around a human face and present an eyeglass-like appearance instead of helmet-like appearance in prior-art HMD designs. The present invention also offers a see-through capability, allowing a user to view the surrounding environment through the viewing optics, as well as the displayed content on an image display device. The present invention offers a see-through FOV that may be considerably larger than the FOV of the virtual view.

In the present invention, the virtual image path of the OST-HMD device includes a miniature image display unit for supplying display content and an ergonomically-shaped display viewing optics through which a user views a magnified image of the displayed content. The display viewing optics includes a freeform waveguide prism containing multiple freeform refractive and reflective surfaces, and may also include additional coupling optics. The waveguide prism serves as a near-eye viewing optics that magnifies the image on a miniature image display device. Light rays emitted from the image display unit are injected into the waveguide prism via the first refractive surface of the prism. The rays may be injected into the prism directly from the display device or through a group of coupling lens. The injected rays propagate through the waveguide prism via multiple reflections (typically 3 or more) and are then coupled out of the prism via the second refractive surface of the prism. The outgoing rays continue propagating and reach the exit pupil of the system where a user places her/his eye to view the virtual content. When light propagating through the waveguide prism, if Total Internal Reflection (TIR) condition on a reflective surface is satisfied, the light loss through the reflection is minimal. Therefore, it is desired, but not strictly required, that all of the reflections satisfy the TIR condition. However, it is also highly desirable to achieve thin designs of the waveguide prism by compromising the TIR condition on some of the reflective surfaces. For the reflective surfaces located inside the designated see-through FOV of the device, where the TIR condition is not satisfied, a semi-transparent coating is applied on these surfaces in order to ensure that the sufficient light from the miniature display unit reach the exit pupil and produce a bright image, while facilitating the optical see-through capability. For the reflective surfaces outside the see-through FOV of the device, if the TIR condition is not satisfied, a high-reflection mirror coating can be applied on the surfaces to minimize light loss. In the present invention, the miniature image display unit can be any type of self-emissive or illuminated pixel arrays that can serve as an image source, including, but not limited to, a liquid crystal on silicon (LCoS) display device, a liquid crystal display (LCD) panel, an organic light emitting display (OLED), Ferroelectric liquid crystal on silicon (FLCoS) device, digital mirror device (DMD), or a micro-projector built upon these aforementioned or other types of micro-display devices.

In the present invention, the see-through path of the head-mounted display device consists of the freeform waveguide prism and a freeform see-through compensation lens. The compensation lens is attached to the physical outer surface of the waveguide prism in order to counteract the ray shift and distortion caused by the prism and to maintain a clear see-through view of a real-world scene. The compensation lens, containing multiple (typically 2 or more) freeform refractive surfaces, enables proper viewing of the surrounding environment across a very wide field of view. The surfaces of the compensation lens are optimized to minimize the shift and distortion introduced to the rays from a real-world scene when the lens is combined with the prism. If the reflection on the attached surfaces of the waveguide prism satisfies TIR condition in the virtual image display path, it is necessary to maintain a small air gap between the waveguide prism and the, compensation lens.

In the present invention, multiple reflections are utilized to extend the optical path length so that the width of the waveguide prism closely matches with the width of an average human head. The long optical path allows facilitating the design of the waveguide prism into an ergonomic shape, as well as maintaining a large see-through FOV. The long optical path of the prism also allows moving the image display unit to the side of the display frame which reduces the front weight of the HMD system and improves the ergonomic fit of the system. Additionally, the shape of the waveguide prism (and the optical viewing device as a whole) can be designed to approximate the natural curve of the human head for optimal ergonomic fit. For example, the prism shape in some of our embodiments is curved to approximate the curvature of a pair of 8-base curve eyeglasses, and the prism shape in some other embodiments approximately follows the form factor of a pair of 4-base curve eyeglasses. Moreover, the overall thickness of the waveguide prism and the compensation lens is deliberately controlled to achieve a thin optics profile (typically less than 30 mm). Overall, the deliberately controlled prism shapes, long optical path, and optics thickness enable a wraparound design of optical see-through HMDs that offers ergonomic fit with the human head and attractive eyeglass-like appearance.

Another key aspect of the present invention is the capability of providing a very large see-through field of view, typically much larger than the FOV of the virtual display. In the invention, this capability is enabled by several mechanisms, for instance, moving the image display device to the side of the head to extend the clear optical aperture of the waveguide prism, deliberately control the freeform surfaces on the waveguide prism and compensation lens to correct ray shifts and distortions and ensure high see-through performance across a large FOV. In some of the embodiments of the present invention, the see-through FOV extends as large as 120-degrees in the horizontal direction and 80-degrees in the vertical direction. The see-through FOV of the present invention can be extended to match the field of view of human eyes.

Due to the long optical path requirement for matching with the width or curvature of the human head, as well as achieving large see-through FOV, the rays from the same point on the image display device will cross at least once inside the waveguide prism, which indicates that an intermediate image of the virtual display is formed inside the waveguide, although the ray cross point may not be well formed.

BRIEF DESCRIPTION OF THE DRAWINGS

FIG. 24 shows the mathematical equations that define the shape of the freeform surfaces.

FIG. 25 shows the parameters of the surfaces for Embodiment 5 of the waveguide shown in FIG. 8 and FIG. 11.

FIG. 26 shows the surface parameters for coupling lens and field lens of Embodiment 5 shown in FIG. 8 and FIG. 11.

FIG. 27 shows position and orientation parameters of the optical surfaces in Embodiment 5 shown in FIG. 8 and FIG. 11.

FIG. 28 shows surface parameters for waveguide prism, of Embodiment 6 shown in FIG. 9 and FIG. 13.

FIG. 29 shows surface parameters for coupling lens and field lens of Embodiment 6 shown in FIG. 9 and FIG. 13.

FIG. 30 shows position and orientation parameters of the optical surfaces in Embodiment 6 shown in FIG. 9 and FIG. 13.

FIG. 31 shows surface parameters for waveguide prism of Embodiment 7 shown in FIG. 10.

FIG. 32 shows surface parameters for coupling lens and field lens of Embodiment 7 shown in FIG. 10 and FIG. 17.

FIG. 33 shows position and orientation parameters of the optical surfaces in Embodiment 7 shown in FIG. 10 and FIG. 17.

FIG. 34 shows surface parameters for compensation lens of Embodiment 7 shown in FIG. 10 and FIG. 19.

FIG. 35 shows position and orientation parameters of the compensation lens of Embodiment 7 shown in FIG. 10 and FIG. 19.

DETAILED DESCRIPTION OF THE INVENTION

The embodiments according to the present invention will be fully described with respect to the attached drawings. The descriptions are set forth in order to provide an understanding of the invention. However, it will be apparent that the invention can be practiced without these details. Furthermore, the present invention may be implemented in various forms. However, the embodiments of the present invention described below shall not be constructed as limited to the embodiments set forth herein. Rather, these embodiments, drawings, and, examples are illustrative and are meant to avoid obscuring the invention.

Figure 1:
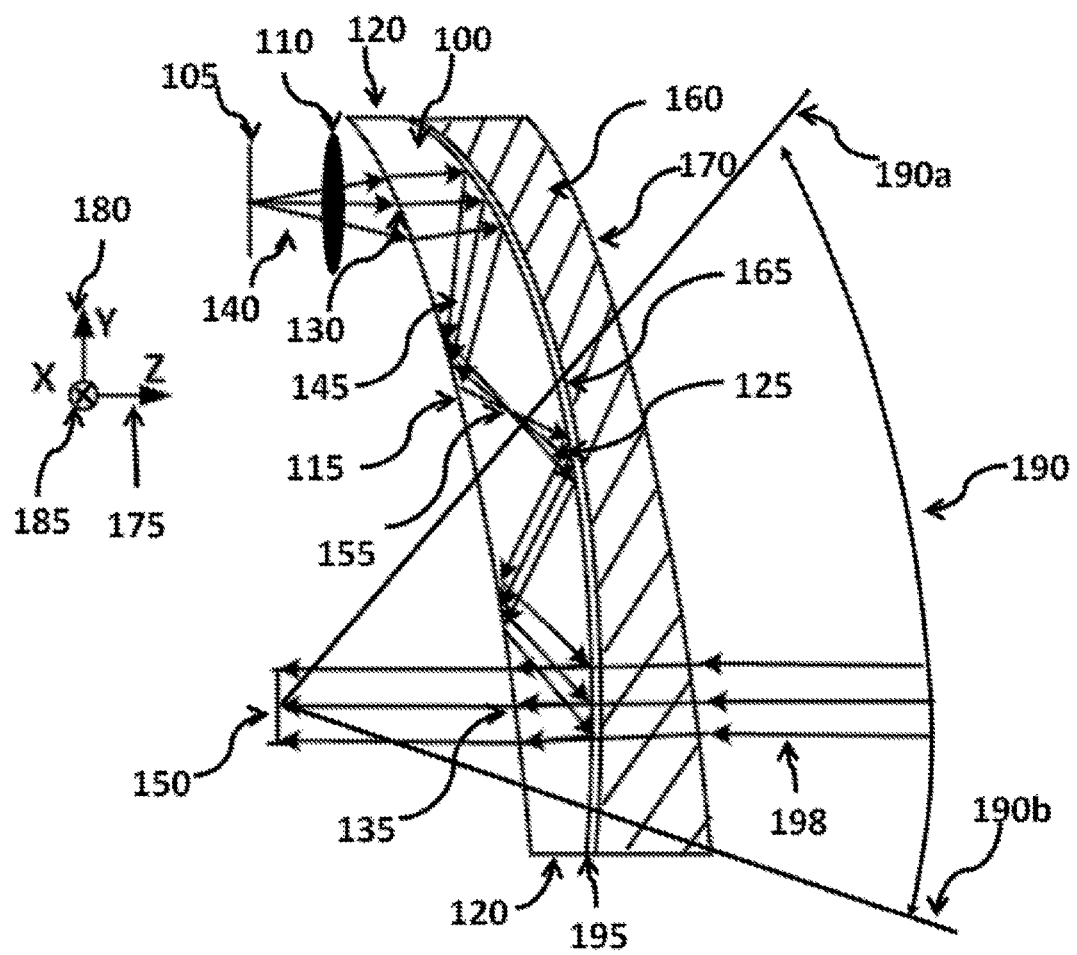
FIG. 1 is a concept illustration of a typical embodiment of the present invention.

The present invention relates to ergonomically designed freeform optical systems for use as an optical viewing device in optical see-through HMOs with an eyeglass-form appearance and a wide see-through field of view (FOV). A typical embodiment of the invention, shown in FIG. 1, is an image display system which projects displayed virtual image into the user's eye pupil through a freeform waveguide prism, allowing the user to see displayed content overlaid upon the real world scene, comprising:

a. A miniature image display unit 105, which serves as an image source and projects light into the waveguide;

b. an optional coupling lens group 110, composed of one or more lenses that guide light from the display unit into the freeform waveguide prism 100 and correct for optical aberrations;

c. a transparent freeform optical waveguide prism 100, as described, which accepts the light from the, display unit 105 and propagates the light until the image is projected into the user's eye pupil; where the waveguide allows the light from a real-world scene to pass through and enters the user's eye pupil; where the waveguide has a physical inner surface 115, physical edge surface 120 and physical outer surface 125, a first refractive surface 130, and a second refractive surface 135, and a plurality of reflective surfaces;

d. a freeform compensation lens 160, secured to the physical outer surface 125 of the waveguide, which corrects for optical distortion caused by viewing the world through the waveguide prism; where the inner physical surface 165 of the compensation lens. 160 approximates the shape of the outer physical surface 125 of the waveguide prism 100, and a small gap 195 is maintained between the waveguide 100 and the compensation lens 160 on surfaces where the TIR criterion is satisfied for the outer physical surface 125 of the waveguide; where the compensation lens 160 is designed to compensate for the effect of ray shift and distortion caused by the waveguide 100 so that the user maintains a clear see-through field of view 190;

whereupon the image display unit 105 can be any type of self-emissive or illuminated pixel arrays that can serve as an image source, including, but not limited to, a liquid crystal on silicon (LCoS) display device, a liquid crystal display (LCD) panel, an organic light emitting display (OLED), ferroelectric liquid crystal on silicon (LCoS device, digital mirror device (DMD), or a micro-projector built upon these aforementioned or other types of microdisplay devices; whereupon the image display unit 105 transmits light 140 into the optional coupling lens 110 followed by the waveguide 100 or into the waveguide directly, through a first refractive surface 130;

whereupon the light 140 follows a path 145 along the waveguide that comprises a plurality of reflections from the first refractive surface 130 to the second refractive surface 135;

whereupon the rays of the light 140 following a path 145 along the waveguide may cross and form an intermediate image 155 inside the waveguide 100; whereupon light 140 passes through the second refractive surface 135 beyond which where the user places his or her pupil 150 to view the image;

whereupon light from the real-world scene 198 passes through the compensation lens 160 and the waveguide 100 before reaching the pupil 150.

One aspect of the invention is an ergonomically shaped freeform waveguide prism, which enables an image to be projected into one refractive input surface of the prism, which is then reflected and refracted until it reaches the user's eye. The shape, optical path length, and thickness of the waveguide prism are deliberately optimized, enabling a wrapped-around design of optical see-through HMDs that offer ergonomic fit with the human head and attractive eyeglass-like appearance.

In a typical embodiment, the freeform waveguide prism of the invention comprises at least three physical surfaces each of which contains a plurality of reflective and refractive optical surfaces disposed upon the physical surfaces, where the interior space of the physical surfaces is filled by a refractive medium having an index (n) greater than 1, the physical and optical surfaces comprising:

a. a physical inner surface 115, disposed towards the eyeball of the user, where the physical inner surface, containing a plurality of reflective and refractive surfaces appropriate to propagating an image to the eyeball of the user, is constrained to fit the ergonomic factors of the human head;

b. a physical outer surface 125, disposed towards the external scene, where the physical outer surface contains a plurality of reflective surfaces appropriate to reflecting an image to the eyeball of the user, where the physical outer surface is within typically 30 mm of the inner surface at all points, where the physical outer surface contains at least one refractive surface to allow light from the external scene to pass through the waveguide and reach the eyeball of the user;

c. a physical edge surface 120, which may potentially contain a refractive surface for light from an image display unit to enter the waveguide;

d. a refractive input surface 130, disposed on one of the physical surfaces, that allows light from an image display unit to enter the waveguide;

e. a refractive output surface 135 that allows light to exit the waveguide, disposed upon the physical inner surface, near the pupil of the user, where the refractive surface may or may not be covered by a semi-transparent coating;

f. a plurality of reflective surfaces, disposed upon the, physical inner and outer surfaces, where each reflection is produced by either satisfying the TIR condition, or by the application of a semi-transparent, partially reflective coating to the surface of the waveguide.

whereupon light 140 from an image display unit 105 enters the waveguide, through a first refractive surface 130;

whereupon the light 140 follows a path 145 along the waveguide that comprises a plurality of reflections upon the plurality of reflective surfaces, from the first refractive surface 130 to the second refractive surface 135, where each reflection is produced either by satisfying conditions of Total Internal Reflection, or by the application of a semi-transparent coating to the surface;

whereupon light 140 passes through the second refractive surface 135 beyond which where the user, places his or her pupil 150 to view the image;

whereupon light 198 from the real-world scene, after being refracted by the compensation lens 160, is refracted through the physical outer surface 125 of the waveguide 100 and the physical inner surface 115 of the waveguide before reaching the pupil 150.

In a typical embodiment, the inner surface 115 and the outer surface 125 of the waveguide is appropriately designed to produce a plurality of reflections that guide light towards the user's pupil without distorting the image. The plurality of reflections extends the optical path length so that the width of the waveguide prism closely fit with the width of an average human head. The long optical path length enables the design of the waveguide prism into an ergonomic shape. The long optical path of the prism further allows moving the image display unit 105 to the side of the display frame which reduces the front weight of the HMD system and improves the ergonomic fit of the system.

In a typical embodiment, the inner surface 115 is constrained to approximate a pre-designated curved surface for the desired eyeglass form factor. The outer surface 125 is further constrained to achieve a thin profile with a thickness of typically no more than 30 mm between the inner surface and outer surfaces. In one practice of the art, we constrained the overall thickness between the inner and outer surfaces to be no more than 12 mm. The parameters of the inner surface and the outer surface of the waveguide are hence optimized that, the image to be projected has minimal distortion at the exit point of the waveguide.

In a typical embodiment, the inner surface 115 of the waveguide 100 may contain multiple surface segments; each surface segment is described by one unique set of parameters.

In a typical embodiment, the outer surface 125 of the waveguide 100 may contain multiple surface segments; each surface segment is described by one unique set of parameters.

In some embodiments, a coupling lens 110 may be added between the miniature image display unit 105 and the first refractive surface 130 of the waveguide 100, facilitating transmission of the light from the display unit 105 into the waveguide. The coupling lens may be used to correct for optical aberrations of the waveguide.

One other aspect of the invention is a freeform see-through compensation lens 160 physically attached to the waveguide prism 100. The compensation lens 160 is designed to counteract the ray shift and distortion caused by the waveguide prism 100 and enables a clear see-through view of a real-world, scene across a wide field of view.

In a typical embodiment, the freeform compensation lens 160 of the invention comprises multiple (typically 2 or more) freeform refractive surfaces, where the interior space of the refractive surfaces is filled by a refractive medium having an index (n) greater than 1, the optical surfaces comprising:

a. a refractive outer surface 170, disposed towards the external scene, that allows light 198 from the external scene to enter the compensation lens, where the refractive outer surface is typically a continuous, single refractive surface and is within typically 30 mm of the physical inner surface 115 of the waveguide prism 100 at all points;

b. a refractive inner surface 165, disposed towards the outer surface 125 of the waveguide prism 100, which allows light to exit the compensation lens and enters into the waveguide prism 100, where the refractive inner surface 165, containing a plurality of refractive surfaces, is typically constrained to approximate or match the shape of the outer surface 125 of the waveguide prism 100, whereupon light from the real-world scene 198, is refracted through the refractive outer surface 170 and the refractive inner surface 165 of compensation lens 160, the physical outer surface 125 and the physical inner surface 115 of the waveguide 100 before reaching the pupil 150.

In a typical embodiment, the compensation lens 160 and the waveguide prism 100 are deliberately optimized together to enable proper viewing of the surrounding environment across a very wide field of view 190. The inner surface 165 and outer surface 170 of the compensation lens 160 are optimized to minimize the shift and distortion introduced to the rays from a real-world scene when the compensation lens 160 is combined with the waveguide prism 100. The inner surface 165 of the compensation lens 160 could be an exact duplicate of the outer surface 125 of the waveguide, prism 100 with a small off-set along the z axis. If a reflection on the attached outer surface 125 of the waveguide prism 100 satisfies the TIR condition in the virtual image display path, it is necessary to maintain a small, air gap 195 between the waveguide prism 100 and the compensation lens 160. Index matching glue can fill in the air gap 195 to cement the compensation lens 160 with the waveguide prism 100 if there is no TIR requirement on the outer surface 125 of the waveguide prism 100. The inner surface 165 of the compensation lens 160 can also be redesigned along with the outer surface 170 of the compensation lens 160 for better see-through performance. For this case, the gap 196 between the waveguide prism 100 and the compensation 160 may be constrained to be less than 6 mm at any points along the surfaces. The outer surface 170 is further constrained to limit the overall thickness of the waveguide prism 100 and the compensation lens 160 to be typically no more than 30 mm. In one practice of the art, we constrained the overall thickness of the prism and lens to be no more than 15 mm. Both the inner surface 165 and the outer surface 170 of the compensation lens 160 should be sufficiently large for the designated see-through FOV 190. The shape and the thickness of the compensation lens are deliberately optimized, enabling a wrapped-around design of optical see-through HMDs that offer ergonomic fit with the human head and attractive eyeglass-like appearance In a typical embodiment, the inner and outer surfaces on the compensation lens 160 and waveguide prism 100 are sufficiently large to enable a wide see-through field of view 190 as large as the visual field of the human eye, for example, relative to the center of the field of view, up to 90° on the temple side and 60° on the nasal side in the horizontal direction, and up to 60° superiorly and inferiorly in the vertical direction. The freeform surfaces on the waveguide prism 100 and compensation lens 160 are optimized to correct ray shifts and distortions to ensure high see-through performance across a large FOV.

All the above mentioned surfaces are free-form surfaces, including, but not limited to, spherical, aspheric, anamorphic aspheric, XYP polynomial or any other types of mathematical prescriptions, which is asymmetric in YZ plane of the global coordinate as shown in FIG. 1, where, the origin of the coordinate system is located at the center of the exit pupil 150 with Z axis 175 pointing to the external scene, Y axis 180 pointing to the temple side, and X axis 185 pointing vertically along the head. Throughout this disclosure, without special notification, the same coordinate system is used for all the drawings and the descriptions.

The primary goal, of the present invention is to design freeform optical systems for use as an optical viewing device in optical see-through HMDs, achieving an eyeglass-form appearance and a wide see-through field of view (FOV). As such, designing the waveguide prism requires optimizing the parameters of each, individual surface to minimize proper optical error function, for example, wavefront error or system modulation transfer functions (MTF). The waveguide prism presented, in FIG. 1 contains multiple freeform surfaces which offer more design freedom than that of the traditional rotationally symmetric optical surfaces. Therefore, the freeform design approach provides the capability of designing optical viewing devices with better optical performance and ergonomic fit while using fewer surfaces compared with optical viewing devices of the similar specifications that use the traditional rotationally symmetric optical surfaces. However, proper constraints must be applied on all of the surfaces in order to have a valid design of the waveguide prism, to achieve our primary goal of maintaining a desired form factor and providing a large see-through FOV.

Figure 2A:
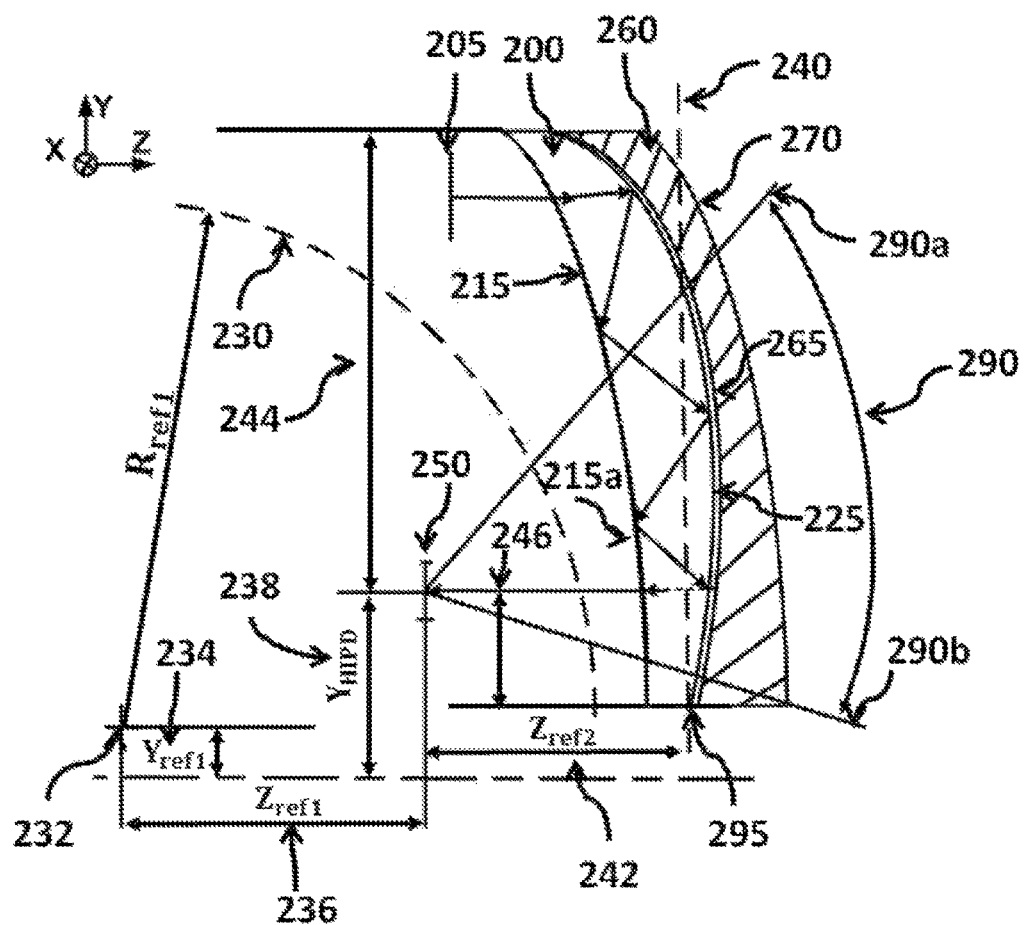
FIG. 2a illustrates a set of key structural constraints for the design of the present invention in a cross-sectional view in the YZ plane.
Figure 2B:
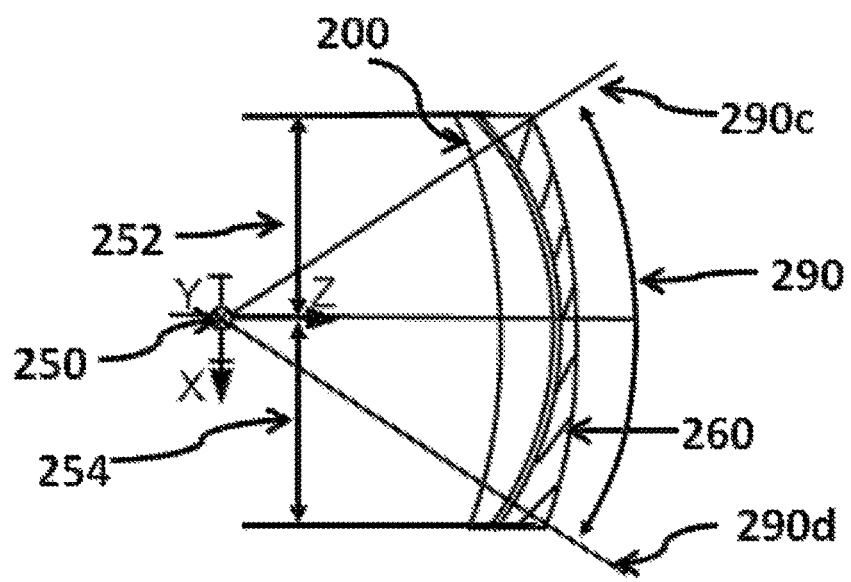
FIG. 2b illustrates additional structural constraints for the design of the present invention in a cross-sectional view in the XZ plane.
Figure 3:
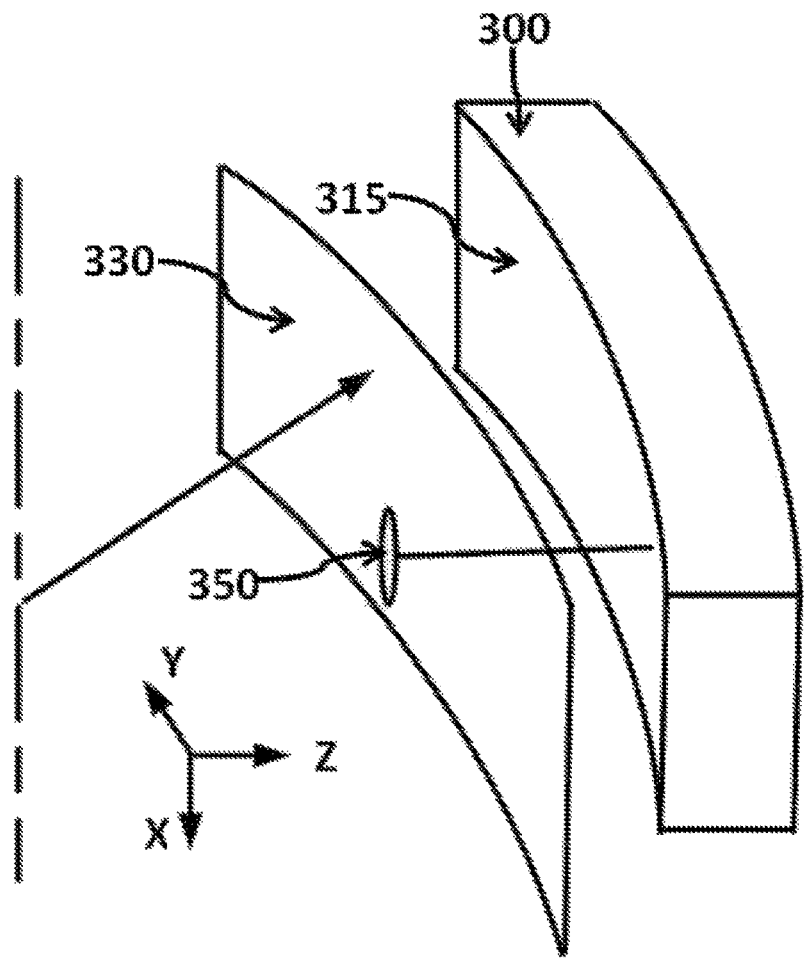
FIG. 3 illustrates the reference surface 230 in a 3D view.

FIGS. 2 and 3 illustrate the structural constraints we employed, during our design process. These control methods put structural signature into our design.

FIG. 2 illustrates a set of key structural constraints for the waveguide prism design. FIGS. 2a and 2b illustrate a cross-sectional view in the YZ plane and XZ plane, respectively. In the figures, the exit pupil 250 of the waveguide 200 is aligned with the pupil of the human eye; the dash line 230 is a reference surface used for constraining the shape of the inner surface 215 of the waveguide 200, as well as the position of the miniature image display unit 205. The reference surface 230 is a cylindrical surface in 3D space (as shown in FIG. 3) approximating the natural curvature of the human head from nasal side of the face to the ear side. The radius of the reference surface 230 in the horizontal YZ plane may vary from 40 mm to as large as 100 mm, depending on the head size of the targeted user population. The radius of the reference surface 230 in the vertical XZ plane may be straight or curved, as long as the inner surface of the prism does not interfere with the face of the user. In one practice of the art, we choose the radius of 65 mm in the horizontal direction which is similar to the radius of an 8-base curve eyeglass. The center of the reference curve 232 is defined by the reference dimensions $Y_{ref1}$ 234, $Z_{ref1}$ 236 and $Y_{HIPD}$ 238, where the dimension $Y_{HIPD}$ 238 is half of the user's inter-pupillary distance (IPD) and IPD has a typical range of 40 mm to 80 mm for over 95% of the population. The reference dimensions 234, 236, and 238 are chosen according to specific design goals. In one practice of the art, the dimensions 234, 236 and 238 are chosen to be 10 mm, 50 mm and 32 mm, respectively, for the example of 8-base curve and an IPD of 64 mm. The dash line 240, defined by the dimension $Z_{ref2}$ 242, is another reference surface for constraining the shape of the inner surface 215. The reference surface 240, which may be a planar surface or a curved surface of a desired shape, ensures that the compensation lens 260 does not stick away too much from the user's face, which could result in an optical design with a very poor appearance. The dash line 290a and 290b mark the boundary of the designated see-through FOV 290 in the horizontal dimension from temple to nose, while the dash line 290c and 290d mark the boundary of the designated see-through FOV 290 in the vertical dimension.

To meet our ergonomic design goal and the desired see-through FOV, the following constraints are applied on the inner surface 215 of the waveguide 200:

a. The entire inner surface 215 is constrained to lie outside the reference surface 230 to ensure that the prism will not interfere with the user's head;

b. The inner surface 215 could deviate away from the reference surface 230, but it is constrained to not pass the reference surface 240;

c. When it is necessary to break the inner surface 215 from a single surface description into multiple surface segments, each of which has its own mathematical formula, to increase the design freedom, the broken point must lie outside the upper boundary 290a of the see-through FOV 290, or the broken segments must be adjoined by an intermediate segment by maintaining first order continuity. In other words, the surface segment 215a of the inner surface 215 inside of the see-through FOV 290 must be a continuous, smooth optical surface. The local radius curvature of the surface segment 215a should be no less than 20 mm in order to maintain the see-through distortion at an acceptable level.

d. The surface segment 215a is constrained to approximate a designed curvature. The shape of the inner surface segment 215a determines the appearance of the waveguide prism as the outer surface 270 of the compensation lens 260 will have a similar shape as the inner surface segment 215a. In one practice of the art, the surface segment 215a is designed to follow a base-8 curve positioned 10 mm outside the reference surface 230 to achieve an 8-base wraparound design.

The outer surface 225 of the waveguide prism 200 has much more freedom than the inner surface 215. The outer surface can be broken into multiple surface segments as needed. The broken points could lie inside or outside the see-through FOV 290. When the broken point is inside the see-through FOV 290, it is required that there is a at least 1 mm ray-free gap around the intersection line of the two adjacent surface segments to ensure a smooth transition between two segments. The outer surface 225 must be wide enough along both X and Y directions for the designated see-through FOV 290. The maximum distance between the outer surface 225 and the inner surface 216 is constrained, typically less than 30 mm to ensure that the waveguide prism is not too thick. In several practice of the art, we constrained the maximum distance to be less than 15 mm. Though desired for low light loss, the TIR condition for the reflections on the outer surface 225 is not required. A half-mirror coating is required for the surface segment inside the see-through FOV 290 if the TIR condition is not satisfied. For the surface segment outside the see-through FOV 290, a high-reflection mirror coating is recommended if the TIR condition is not satisfied.

Additional to the constraints applied on the inner and outer surfaces of the waveguide prism, the width 244 of the waveguide prism 200, measured from the eye pupil 250 to the temple side in Y direction, is constrained with a lower bound so that the waveguide prism is wide enough to provide the desired see-through FOV 290 on the temple side. The width 244 is further constrained with an upper bound to ensure the resultant waveguide prism does not stick out too much on the temple side of the human head for the purpose of ergonomic fit and attractive appearance. In one practice of the art, the width 244 is set with an upper bound of 50 mm from the exit pupil 250 in Y direction.

The width 246 of the waveguide prism, measured from the eye pupil 250 to the nose side in Y direction, is constrained with a lower bound so that the waveguide prism 200 is wide enough to provide the desired see-through FOV 290 on the nasal side. The width 246 is further constrained with an upper bound to ensure the resultant waveguide prism does not interfere with the nose bridge of the human head. In one practice of the art, the width 246 is set with an upper bound of 30 mm from the pupil 250 in Y direction.

The heights 262 and 254 of the waveguide prism, measured from the eye pupil 250 to the forehead and cheek in X direction, respectively, are constrained with a tower bound so that the waveguide prism 200 is tall enough to provide the desired see-through FOV 290 above and below in the vertical dimension.

Two position constraints are applied to the miniature image display unit 205: (1) Any part of the display unit should lie outside of the reference surface 230; (2) The display unit should not be too far away from the exit pupil 250 in Y direction.

The compensation lens 260 is designed to counteract the ray shift and distortion caused by the waveguide prism 200 and is physically attached to the waveguide prism 200. The inner surface 265 and outer surface 270 of the compensation lens 260 are optimized to minimize the shift and distortion introduced to the rays from a real-world scene when the compensation lens 260 is combined with the waveguide prism 200. The inner surface 265 of the compensation lens 260 could be an exact duplicate of the outer surface 225 of the waveguide prism 200 with a small off-set along the z axis. If a reflection on the attached outer surface 225 of the waveguide prism 200 satisfies the TIR condition in the virtual image display path, it is necessary to maintain a small air gap 295 between the waveguide prism 200 and the compensation lens 260. Index matching glue can fill in the air gap 295 to cement the compensation lens with the waveguide prism if there is no TIR requirement on the outer surface 225 of the waveguide prism 200. The inner surface 265 of the compensation lens 260 can also be redesigned along with the outer surface 270 of the compensation lens 260 for better see-through performance. For this case, the gap 295 between the waveguide prism 200 and the compensation 260 may be constrained to be less than 6 mm at any points along the surfaces. The outer surface is further constrained to limit the overall thickness of the waveguide prism 200 and the compensation lens 260 to be typically no more than 30 mm. In one practice of the art, we constrained the overall thickness of the prism and lens to be no more than 15 mm. Both the inner surface 265 and the outer surface 270 of the compensation lens 260 should be sufficient large for a designated see-through FOV 290.

FIG. 3 illustrates the reference surface 230 in a 3D view. The reference curve 230 in FIG. 2 is swept along X axis to a cylindrical surface 330. The entire inner surface 325 of the waveguide prism 300 should lie outside the cylindrical surface 330 to ensure the prism will not physically interfere with the user's face. The circle 350 marks the exit pupil position of the waveguide 300.

The following figures show embodiment examples of the present invention with some or all of the aforementioned constraints enforced and resulting in different design structures for different base curve styles.

Figure 4:
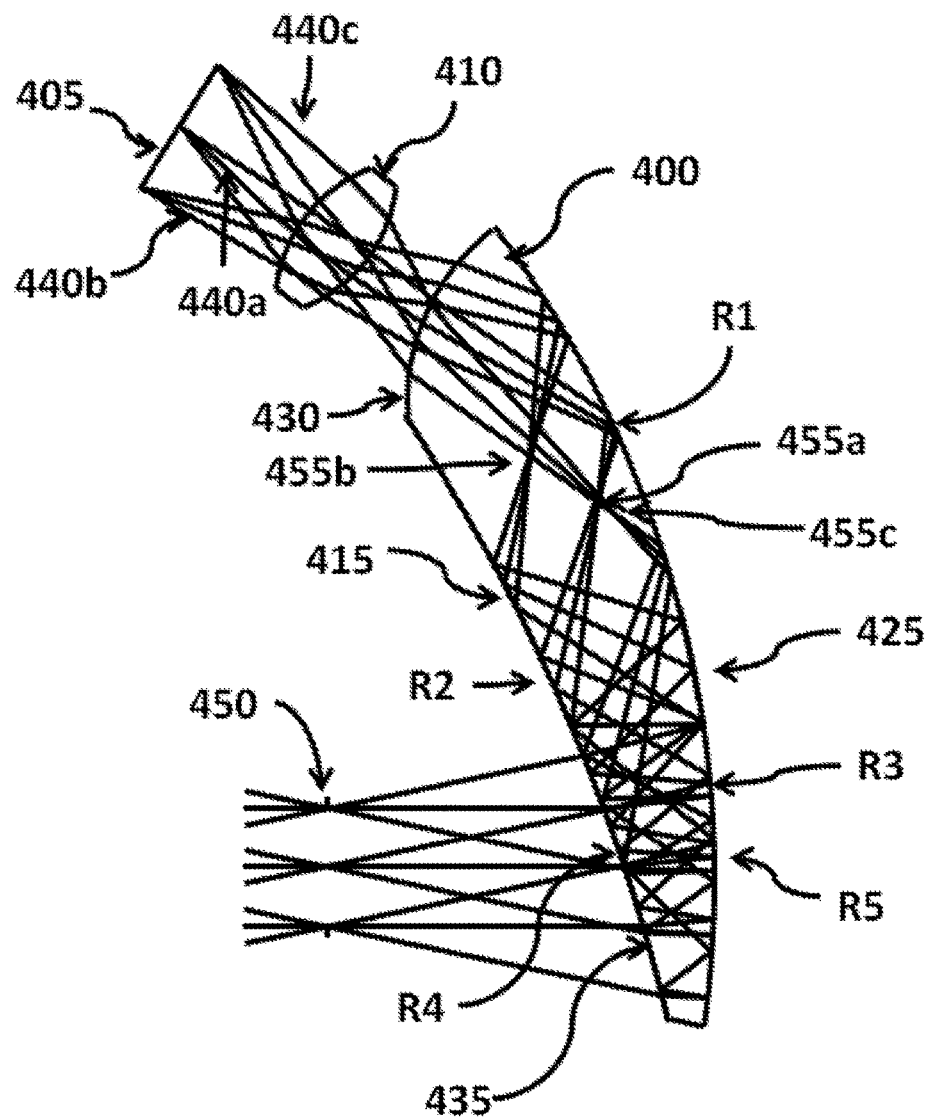
FIG. 4 shows a 5-reflection preferred embodiment of the waveguide prism of the present invention with the inner surface approximating an 8-base curve wraparound appearance.

FIG. 4 shows a 5-reflection preferred embodiment of the waveguide prism of the present invention with the inner surface approximating an 8-base curve wraparound appearance. This embodiment can be used to implement an HMD system with an 8-base wraparound eyeglass form factor. In this embodiment, the inner physical surface 415 and the outer physical surface 425 of the waveguide prism 400 are two continuous, smooth surfaces, each of which are described by a set of freeform surface parameters. The refractive surface 430 of the waveguide prism 400 is not a part of the inner surface 415 and is described by a different set of surface parameters. In this drawing, the ray bundles 440a, 440b and 440c are originated from three different pixels on the miniature image display unit 405. Between the display unit 405 and the waveguide prism 400, a coupling lens 410 is used to help correct optical aberrations and improve the image quality. In this embodiment, the ray bundles 440a, 440b and 440c enter the waveguide prism 400 through the refractive surface 430, are reflected consecutively five times (R1 through R5) by the outer surface 425 and the inner surface 415, are then transmitted through the refractive surface 435, and reach the exit pupil 450. Among the five reflections, the reflection R1 on the outer surface 425 and the reflection R2 on the inner surface 415 satisfy the TIR condition, while the reflection R4 on the inner surfaces 415 and the reflections R3 and R5 on the outer surface 425 do not satisfy the TIR condition. In order to increase the reflective efficiency for the reflections R3, R4 and R5, it is necessary to apply semi-transparent coatings on both the inner surface 415 and the outer surface 425. In order to maintain the TIR condition for the reflections R1 and R2, a dielectric coating is preferred. To ensure an 8-base curve, wraparound form factor, the inner surface 415 is constrained to approximate a pre-defined 8-base curve in the horizontal dimension. Inside the waveguide prism 400, the ray bundles 440a, 440b and 440c are refocused and form intermediate images 455a, 455b and 455c, respectively.

Figure 5:
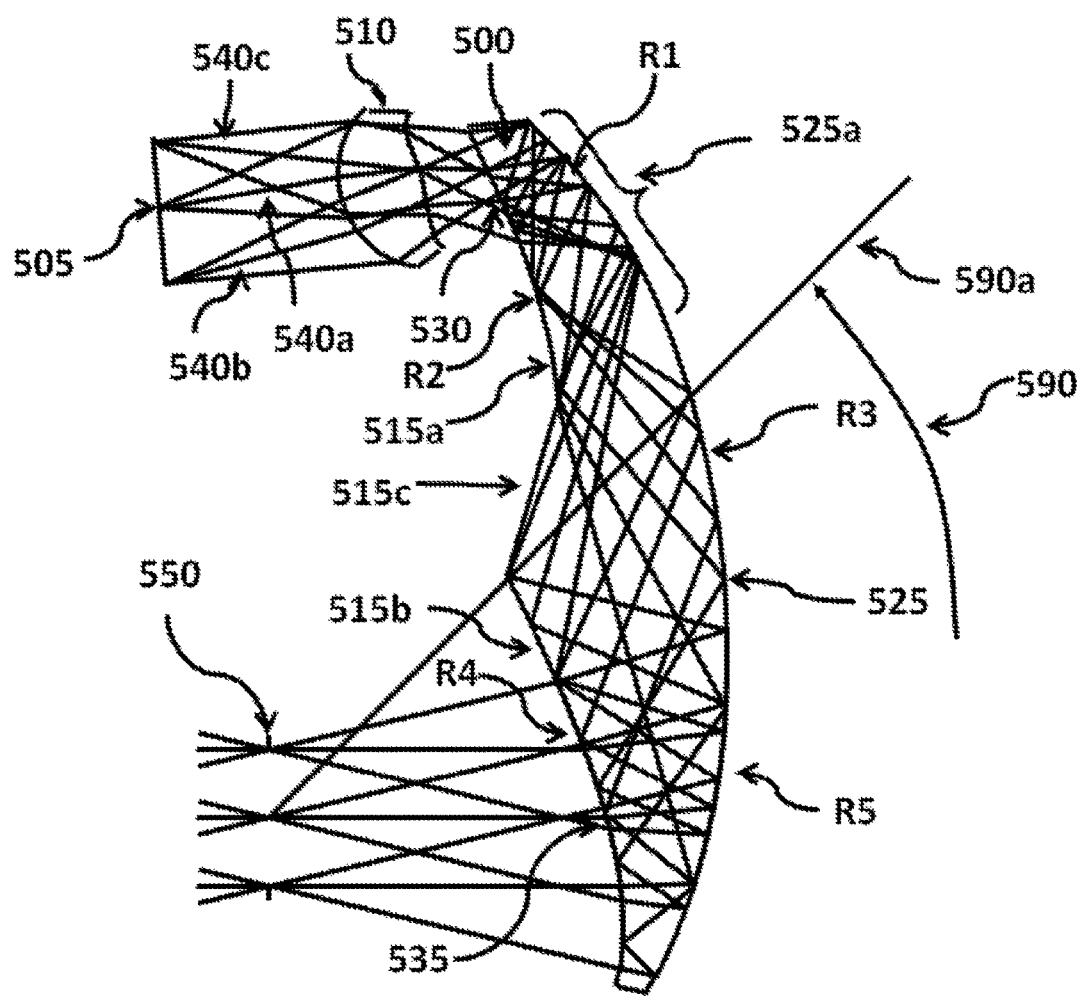
FIG. 5 shows another 5-reflection preferred embodiment of the waveguide prism of the present invention with the inner surface approximating an 8-base curve wraparound appearance.

FIG. 5 shows another 5-reflection preferred embodiment of the waveguide prism of the present invention with the inner surface, approximating an 8-base curve. In this embodiment, the inner physical surface 515 of the waveguide prism 500 is broken into two surface segments 515a and 515b, each of which is a smooth surface described by a different set of freeform surface parameters. The outer physical surface 525 of the waveguide prism 500 is a continuous, smooth surface described by a set of freeform surface parameters. The refractive surface 530 and the reflective surface 515a are described by the same set of freeform surface parameters and thus are one single smooth surface; the reflective surface 515b and the refractive surface 535 are described by the same set of freeform surface parameters and are one single smooth surface. The surface segments 515a and 515b are connected by a surface segment 515c. The surface segment 516c is designed to maintain the first-order continuity at the intersection between surfaces 515b and 515c if the intersection is inside the upper boundary 590a of the see-through FOV 590. Similarly, the first-order continuity at the intersection between surfaces 515a and 515c may also be necessary if the intersection is inside the upper boundary 590a of the see-through FOV 590. Among the five reflections, the reflections R2, R3 and R4 satisfy the TIR condition, while the reflections R1 and R5 do not satisfy the TIR condition. In order to increase the reflection efficiency, the outer surface 525 is coated with a semi-transparent coating. In order to maintain the TIR condition for the reflection R3 on the surface 525 for the reflection R3, a dielectric coating is preferred. A mirror coating can be applied on the upper surface segment 525a if the segment 525a is outside the upper boundary 690a of the see-through FOV 590. Between the image display unit 505 and the refractive surface 530 of the waveguide prism 500, a coupling lens 510 is used to help correct optical aberrations and improve the image quality. The surface segment 515b is constrained to approximate an 8-base curve, while the surface segment 515a is constrained to move closer to the outer surface 525 for the benefit of reducing the overall weight of the waveguide prism 500.

Figure 6:
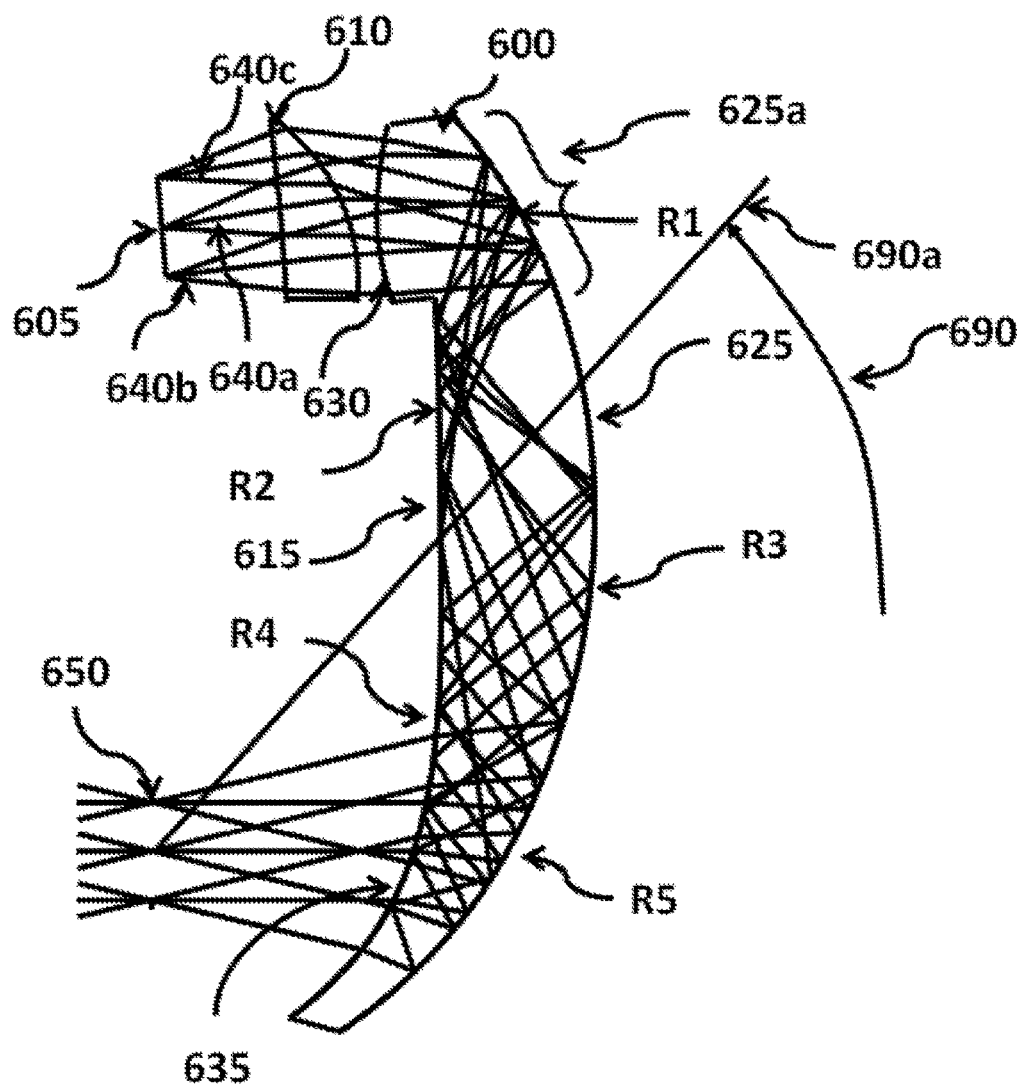
FIG. 6 shows another 5-reflection preferred embodiment of the waveguide prism of the present invention with a flat inner curve on the temple side.

FIG. 6 shows another 5-reflection preferred embodiment of the waveguide prism of the present invention with a flat inner curve on the temple side. In this embodiment, the refractive surface 630 of the waveguide prism 600 is not a part of the inner surface 615 and is described by a different set of surface parameters, while the inner surface 615 is a continuous, smooth surface. The refractive surface 635 shares the same set of surface parameters as the surface 615. The outer physical surface 625 of the waveguide prism 600 is a continuous, smooth surface described by a set of freeform surface parameters. Among the five reflections, the reflections R2, R3, and R4 satisfy the TIR condition, while the reflections R1 and R5 do not satisfy the TIR condition. In order to increase the reflection efficiency, the outer surface 625 is coated with a semi-transparent coating. In order to maintain the TIR condition for the reflection R3 on the surface 625, a dielectric coating is preferred. A mirror coating can be applied on the upper surface segment 625a if the surface segment 625a is outside the upper boundary 690a of the see-through FOV 690. The inner surface 615 is not constrained to any predefined curvature but the position of the surface is constrained to ensure the prism is not too far away from the human face. Between the image display unit 605 and the refractive surface 630 of the waveguide prism 600, a coupling lens 610 is used to help correct optical aberrations and improve the image quality.

Figure 7:
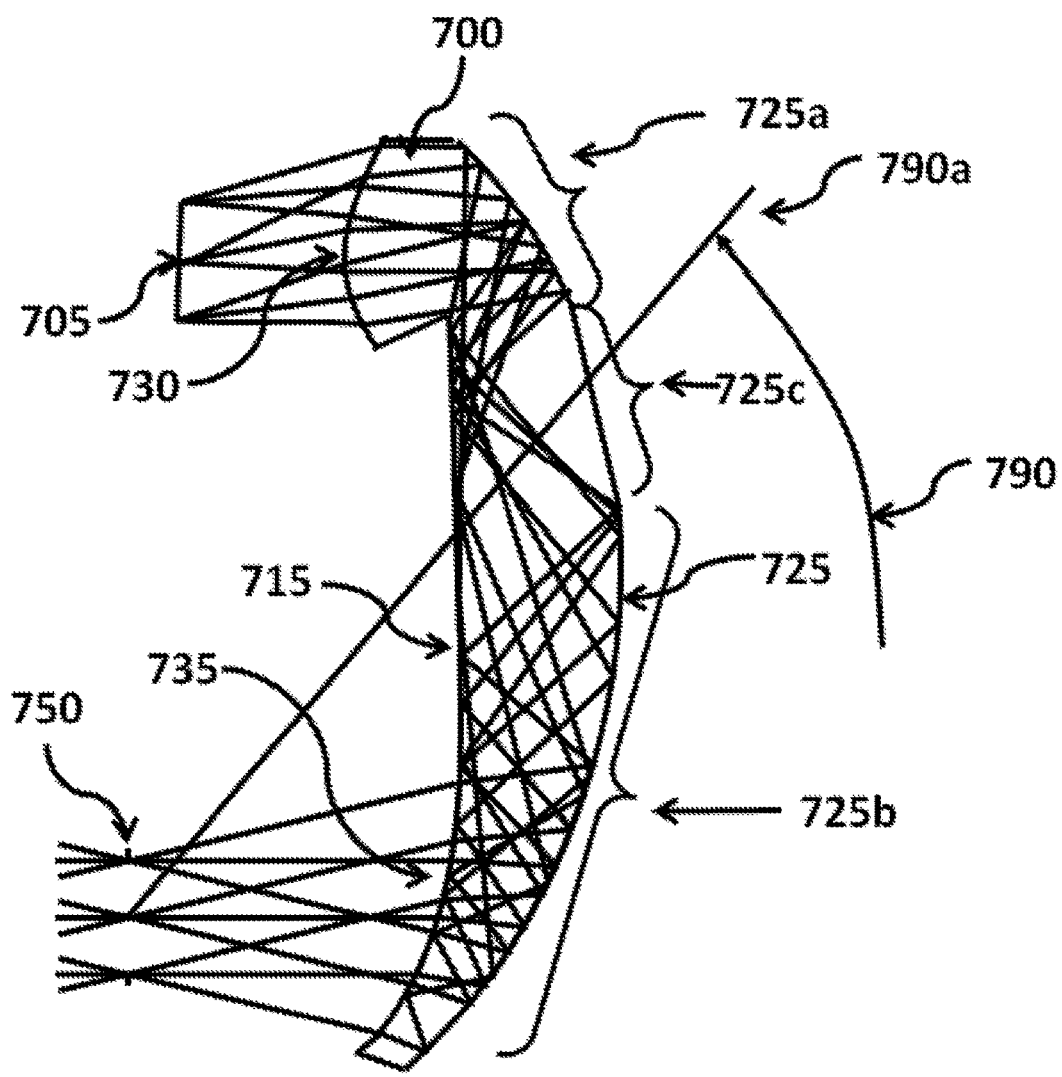
FIG. 7 shows another 5-reflection preferred embodiment of the waveguide prism of the present invention with a form similar to the previous embodiment in FIG. 6.

FIG. 7 shows another 5-reflection preferred embodiment of the waveguide prism of the present invention similar to the embodiment shown in FIG. 6. In this embodiment, the refractive surface 730 of the waveguide prism 700 is not a part of the inner surface 715 and is described by a different set of surface parameters, while the inner surface 715 is a continuous, smooth surface. The refractive surface 735 shares the same set of surface parameters as the surface 715. The outer physical surface 725 of the waveguide prism 700 is broken into two segments 725a and 725b, each of which is a smooth surface described by a different set of freeform surface parameters. The surface segments 725a and 725b are connected by a surface segment 725c. The surface segment 725c is designed to maintain the first-order continuity at the intersection between surfaces 725b and 725c if the intersection is inside the upper boundary 790a of the see-through FOV 790. Similarly, the first-order continuity at the intersection between surfaces 725a and 725c may also be necessary if the intersection is inside the upper boundary 790a of the see-through FOV 790. Additionally, this embodiment does not require a coupling lens between the waveguide prism 700 and the miniature image display unit 705 as the prism itself is sufficient to correct optical aberrations.

Figure 8:
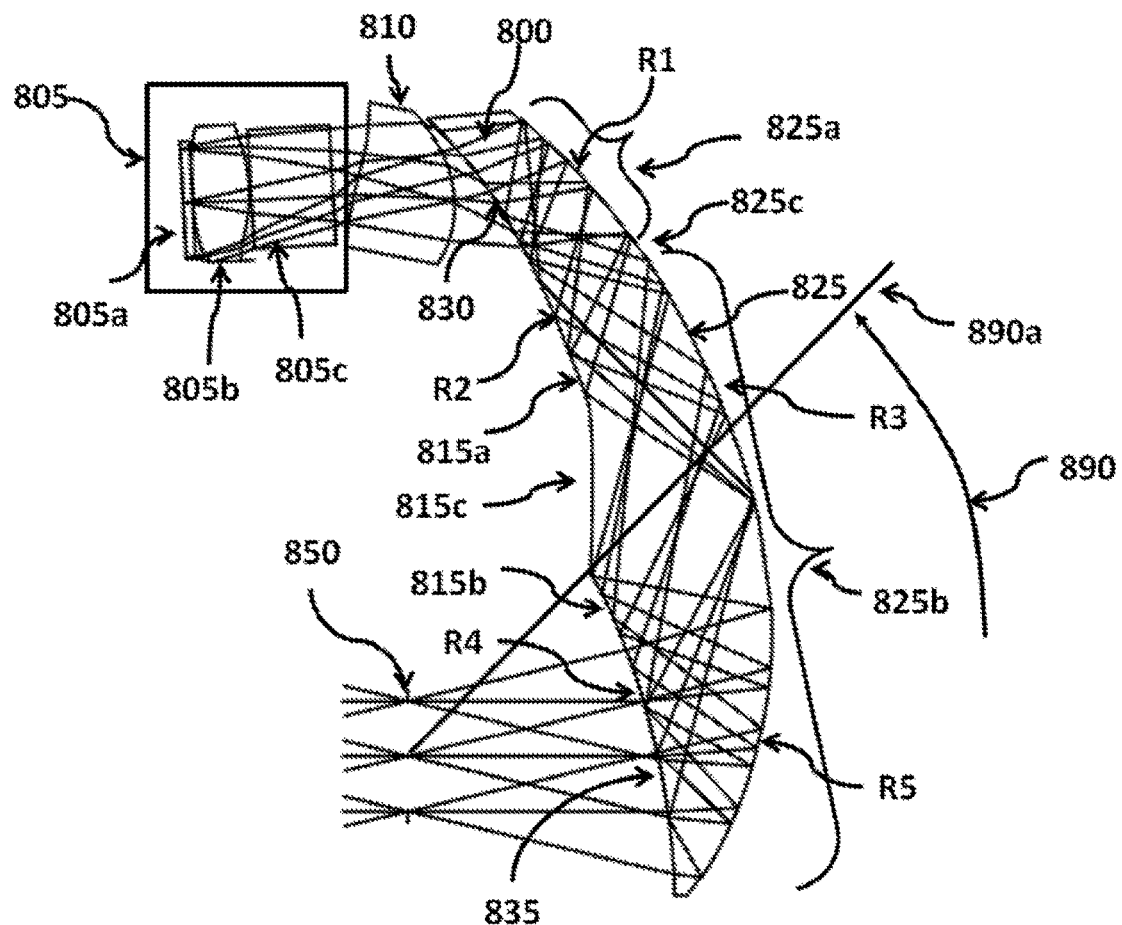
FIG. 8 shows another 5-reflection preferred embodiment of the waveguide prism of the present invention with the inner surface approximating an 8-base curve wraparound appearance and the embodiment is based on a reflective type micro-display.
Figure 11:
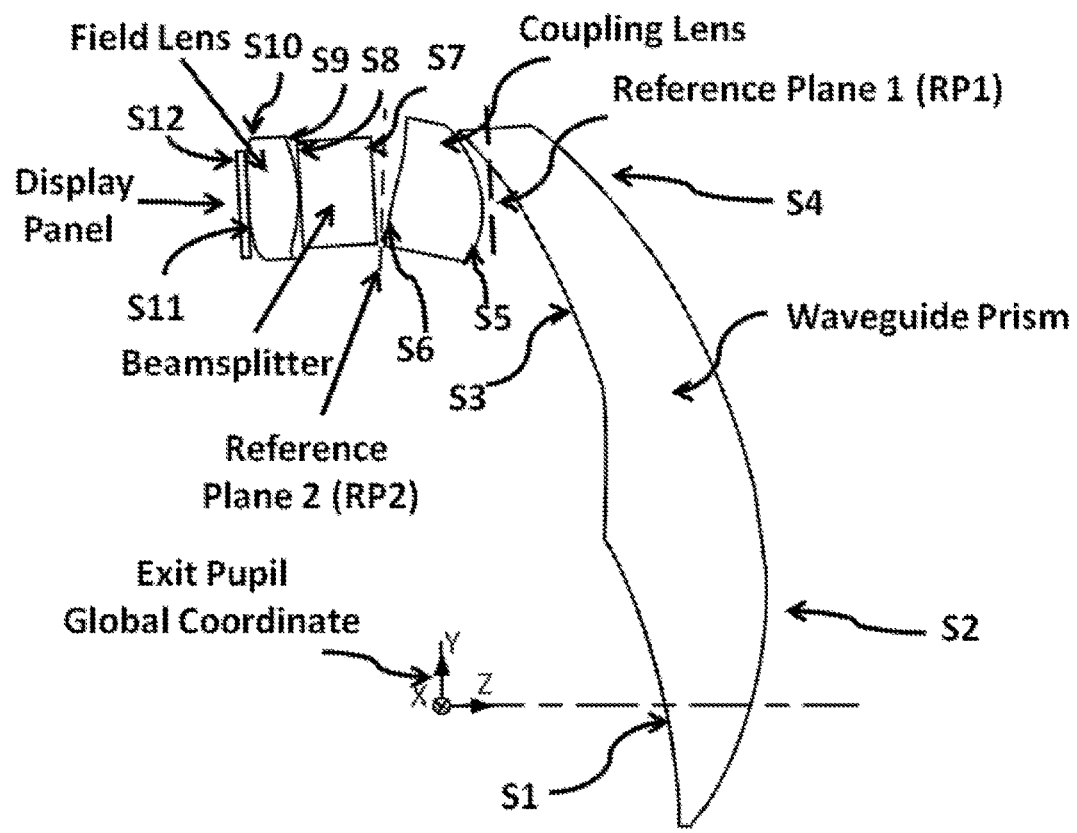
FIG. 11 shows the notation and element definition for the embodiment 5 shown in FIG. 8.

FIG. 8 shows a 5-reflection preferred embodiment of the waveguide prism of the present invention with the inner surface approximating an 8-base curve, and this embodiment is designed specifically for a reflective-type illuminated pixel arrays such as LCoS or FLCoS type microdisplay panels. In this embodiment, the inner physical surface 815 of the waveguide prism 800 is broken into two surface segments 815a and 815b, each of which is a smooth surface described by a different set of freeform surface parameters. The refractive surface 830 and the reflective surface 815a are one single smooth surface and are described by the same set of surface parameters; the reflective surfaces 815b and the refractive surface 835 are one single smooth surface and are described by the. same set of surface parameters. The surface segments 815a and 815b are connected by a surface segment 815c. The surface segment 815c is designed to maintain the first-order continuity at the intersection between surfaces 815b and 815c if the intersection is inside the upper boundary 890a of the see-through FOV 890. Similarly, the first-order continuity at the intersection between surfaces 815a and 815c may also be necessary if the intersection is inside the upper boundary 890a of the see-through FOV 890. The outer physical surface 826 of the waveguide prism 800 is broken into two segments 825a and 825b, each of which is a smooth surface described by a different set of freeform surface parameters. The surface segments 825a and 826b are connected by a surface segment 825c. The surface segment 825c is designed to maintain the first-order continuity at the intersection between surfaces 825b and 825c if the intersection is inside the upper boundary 890a of the see-through FOV 890. Similarly, the first-order continuity at the intersection between surfaces 825a and 825C may also be necessary if the intersection is inside the upper boundary 890a of the see-through FOV 890. The surface segment 815b is constrained to approximate an 8-base curve, while the surface segment 815a is constrained to be closer to the outer surface 825a for the benefit of reducing the overall weight of the prism. Among the five reflections, the reflections R2, R3 and R4 satisfy the TIR condition, while the reflections R1 and R5 do not satisfy the TIR condition. Therefore, a semi-transparent coating is required for the outer surface 825 in order to increase the reflection efficiency. In order to maintain the TIR condition for the reflection R3 on the surface 825b, a dielectric coating is preferred. A mirror coating can be applied on the upper surface segment 825a if the surface segment 825a is outside the upper boundary 890a of the see-through FOV 890. Between the miniature image display unit 805 and the refractive surface 830 of the waveguide prism 800, a coupling lens 810 is used to help correct optical aberrations and improve image qualities. In this embodiment, the miniature image display unit 805 contains a reflective micro-display panel 805a (e.g. LCoS display panel), a field lens 805b and a polarized beamsplitter 805c. The field lens 805b is employed to enforce the tele-centricity of light at the micro-display surface. The polarized beamsplitter 805c acts as, a beam combiner to merge the display illumination path (not shown) and the display imaging path. The polarized beamsplitter 805c also acts as a polarizer and then an analyzer for the incoming and outgoing light to micro-display panel 805a. Element definitions for this embodiment are shown in FIG. 11, and parameters are given in FIG. 25-27 (Table 2-4).

Figure 9:
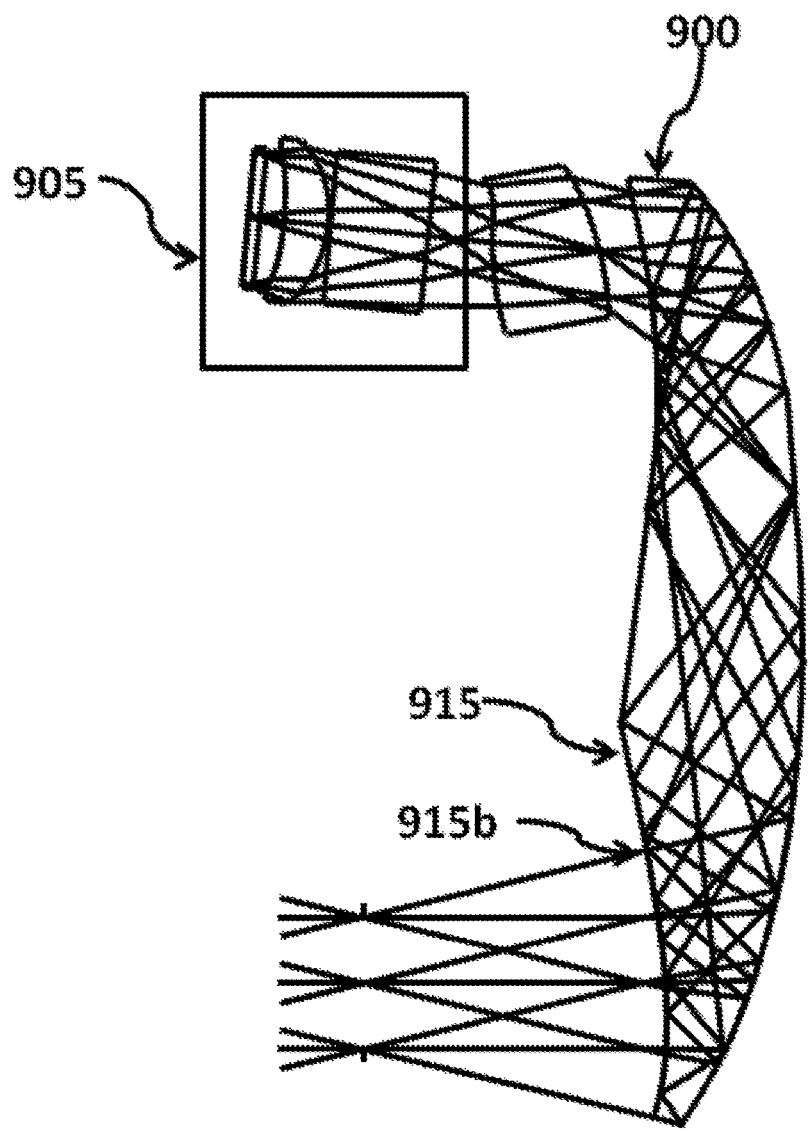
FIG. 9 shows another preferred embodiment of the present invention similar to the previous embodiment in FIG. 8 but with the inner surface approximating a 4-base curve.
Figure 13:
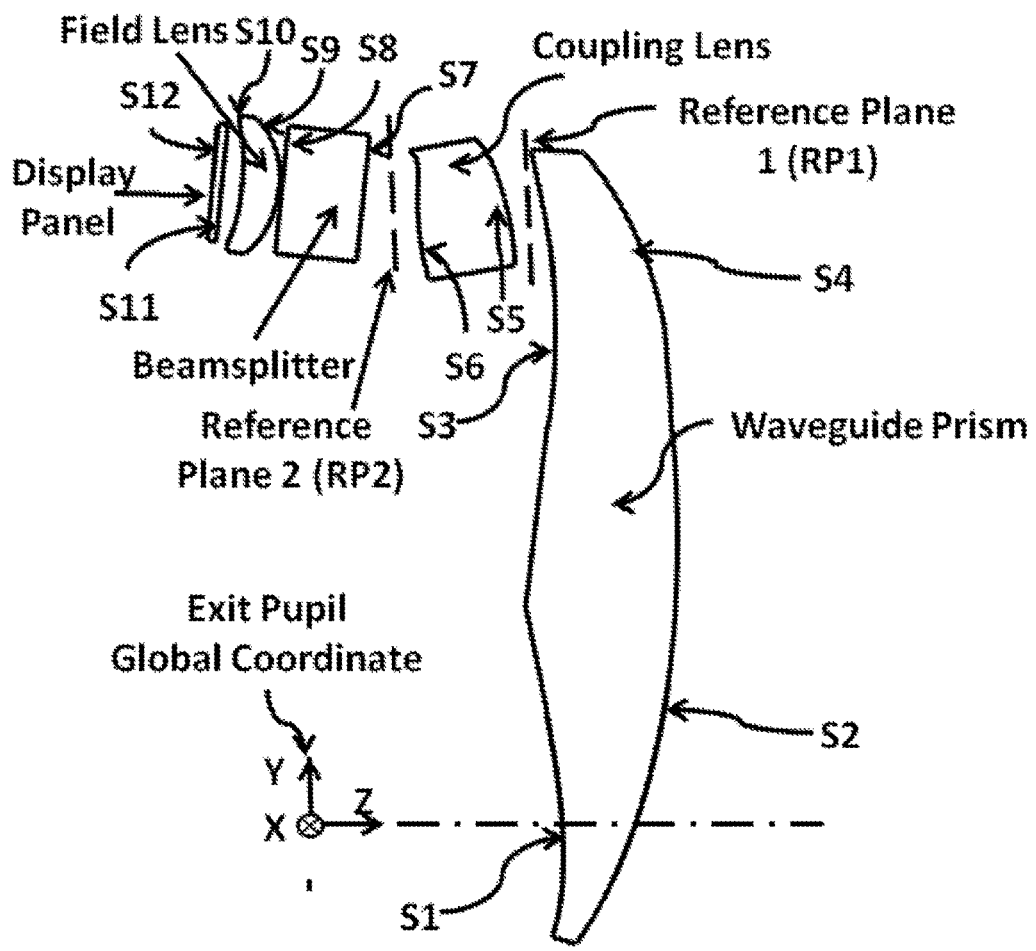
FIG. 13 shows the notation and element definition for the embodiment 6 shown in FIG. 9.

FIG. 9 shows another preferred embodiment of the present invention similar to the embodiment shown in FIG. 8—except that the inner physical surface 915 of the waveguide prism 900 is optimized to approximate a 4-base curve instead of an 8-base curve. In this embodiment, the waveguide prism 900 has the similar structural characteristics to these of the embodiment in FIG. 8. The inner surface segment 915b, however, is constrained to approximate a 4-base curve. As a result, this embodiment can be used to implement an HMD system with a 4-base eyeglass form factor, having a flat appearance like a pair of 4-base curve eyeglass. Similar to the embodiment shown in FIG. 8, this embodiment is designed specifically for a reflective-type illuminated pixel arrays such as LCoS or FLCoS type micro-display panels. Element definitions for this embodiment are shown in FIG. 13, and parameters are given in FIG. 28-30 (Table 5-7).

Figure 10:
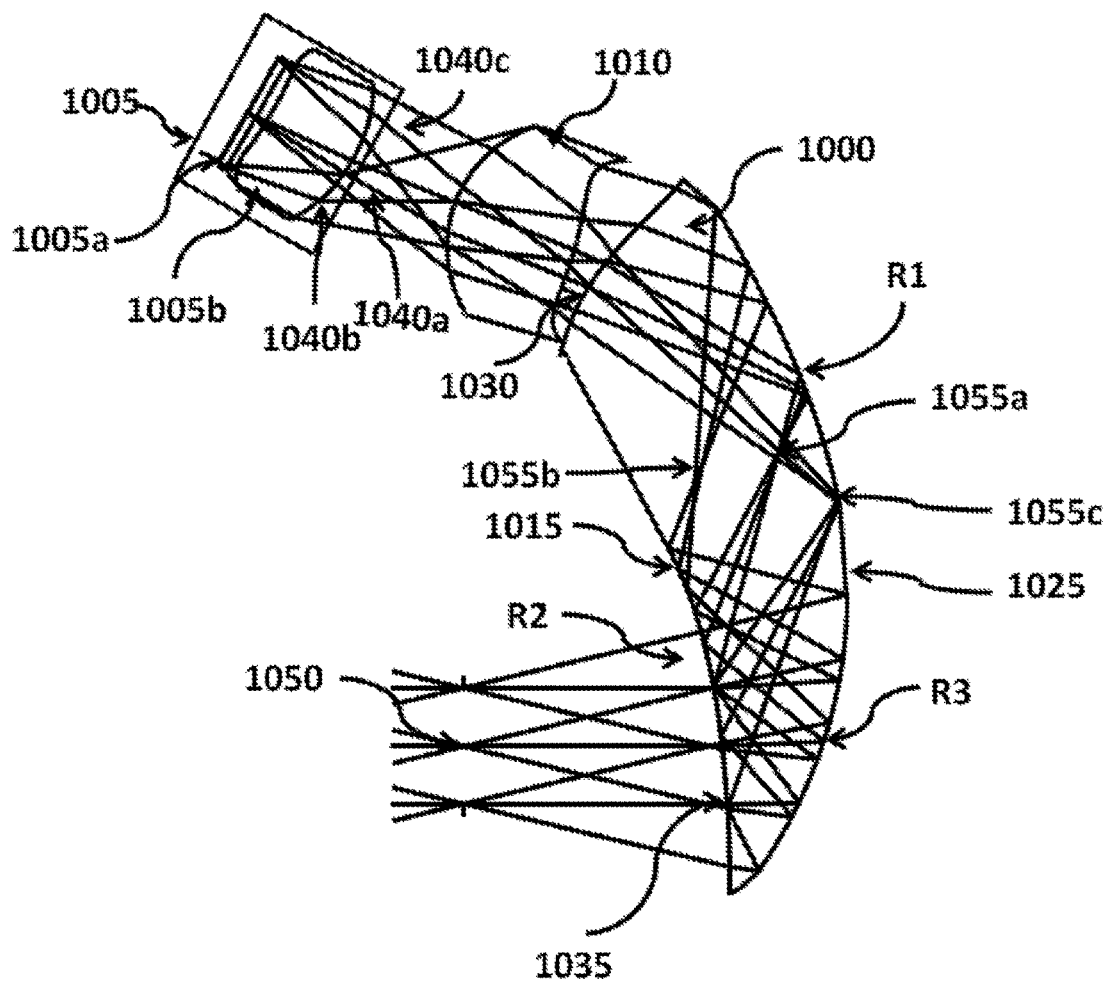
FIG. 10 shows a 3-reflection preferred embodiment of the waveguide prism of the present invention with the inner surface approximating an 8-base curve wraparound appearance.
Figure 17:
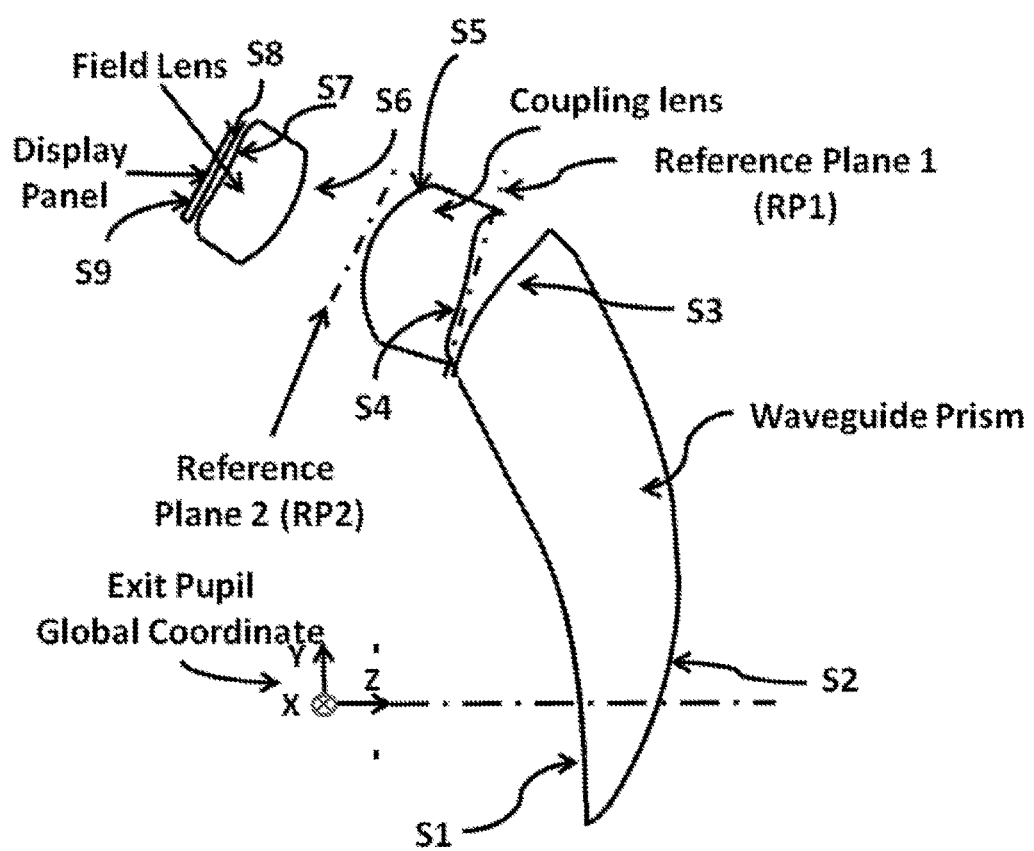
FIG. 17 shows the notation and element definition for the embodiment 7 shown in FIG. 10.

FIG. 10 shows a 3-reflection preferred embodiment of the waveguide prism of the present invention with the inner surface approximating an 8-base curve wraparound appearance. This embodiment can be used to implement an HMD system with an 8-base curve wraparound form factor. In this embodiment, the inner physical surface 1015 and the outer physical surface 1025 of the waveguide prism 1000 are two continuous, smooth surfaces, each of which are described by a set of freeform surface parameters. The refractive surface 1030 of the waveguide prism 1000 is not a part of the inner surface 1015 and is described by a different set of surface parameters. The miniature image display unit 1005 contains a micro-display panel 1005a and a field lens 1005b which is used to achieve tele-centricity of light at the micro-display surface. The micro-display panel 1005a can be either a reflective type micro-display (for example: LCoS, FLCoS, or DMD panels) or a transmissive type micro-display (for example: LCD panel) or a self-emissive type micro-display (for example: OLED panel). In the case of a reflective type micro-display panel, a beamsplitter (not shown) is required after the field lens 1005b to introduce an illumination path (not shown). Between the image display unit 1005 and the waveguide prism 1000, a coupling lens 1010 is used to help correct optical aberrations and improve image qualities. In this design example, the ray bundles 1040a, 1040b and 1040c originated from three different pixels on the micro-display 1005a enter the waveguide prism 1000 through the refractive surface 1030, are reflected three times by the inner surfaces 1015 and the outer surface 1025, are then transmitted through the refractive surface 1035, and reach the exit pupil 1050. In this example, among the three reflections, the reflections R1 and R2 satisfy the TIR condition and the reflection R3 on the outer surface 1025 does not satisfy the TIR condition. In order to increase the reflective efficiency for the reflection R3, it is necessary to apply a semi-transparent coating on the outer surface 1025. In order to maintain TIR condition for the reflection R1, a dielectric coating is preferred. To ensure an 8-base eyeglass form factor, the inner surface 1015 is constrained to approximate a pre-defined 8-base curve. inside the waveguide prism 1000, the ray bundles 1040a, 1040b and 1040c are refocused and form intermediate images 1055a, 1055b and 1055c, respectively. Element definitions for this embodiment are shown in FIG. 17, and parameters are given in FIG. 31-33 (Table 8-10).

In varying embodiments, the image display unit may be disposed towards the inner surface, outer surface, or edge surface, depending on the shape of the lens, the number of reflections and the desired eyeglass form factor. In particular embodiments, for an 8-base eyeglass form factor, the image display apparatus would usually be disposed towards the edge surface of the waveguide, while for a 4-base eyeglass form factor it would usually be disposed towards the inner surface.

While 8-base and 4-base eyeglass designed have been described herein, it is possible to use the concepts of the present invention to design for any other eyeglass shape, such as the standard industry eyeglass form factors, including, but not limited to, 2-base, 3-base, 4-base, 5-base, 6-base, 7-base, 8-base, and 9-base.

A feature of the present invention is that the extended optical path length requires the surfaces to be designed such that ray bundles are refocused at intermediate points through the prism. This refocusing of the light produces an intermediate image part way through the prism, as a result the rays have diverged less at the exit refractive surface, an advantage of which is the overall thickness of the waveguide does not increase rapidly as the field of view of the virtual image path increases in an OST-HMD.

Seven embodiments (FIGS. 4-10) are presented according to the present invention. In the following sections, numerical data of embodiments 5 to 7 (FIG. 8-10) are presented. Three types of freeform surfaces are employed in the embodiments and the mathematic equation of each surface type is listed in FIG. 24 (Table 1). The equations in FIG. 24 (Table 1) are given in the local coordinate system with the origin at the vertex of the surface. The position and orientation of the surface are either directly defined in the global coordinate system or through a reference coordinate system. As described in the detailed description of FIG. 1, the global coordinate is located at the center of the exit pupil with the x axis pointing inside the paper, y axis pointing up and z axis pointing right toward the external scene.

Numerical Data for Embodiment 5 (described in FIG. 8)

FIG. 11 shows the notation and element definition for embodiment 5 (FIG. 8). The embodiment is designed for a 0.37" reflective-type display (for instance LCoS or FLCoS), yielding a virtual FOV of 26.5° in Y direction and 15° in X direction, and 30° diagonally. The system F/number is 2. FIG. 25 (Table 2) lists the surface parameters for the waveguide prism 800 and FIG. 26 (Table 3) lists the surface parameters for the coupling lens 810 and field lens 805b. The position and orientation of all the optical surfaces as well as the optical material for each optical element are listed in FIG. 27 (Table 4).

Figure 12:
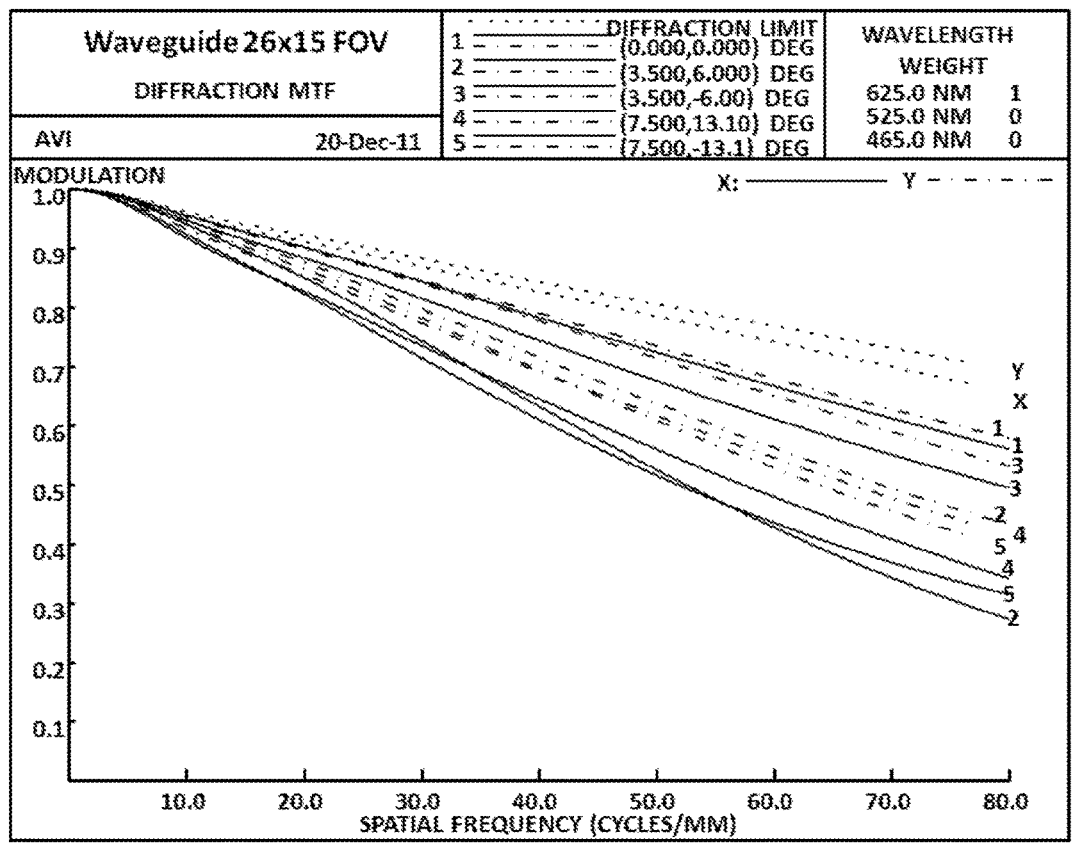
FIG. 12 shows the MTF plots of the selected fields for Red (625 nm), Green (525 nm), and Blue (465 nm) wavelengths for the embodiment 5. 100251
Figure 12:
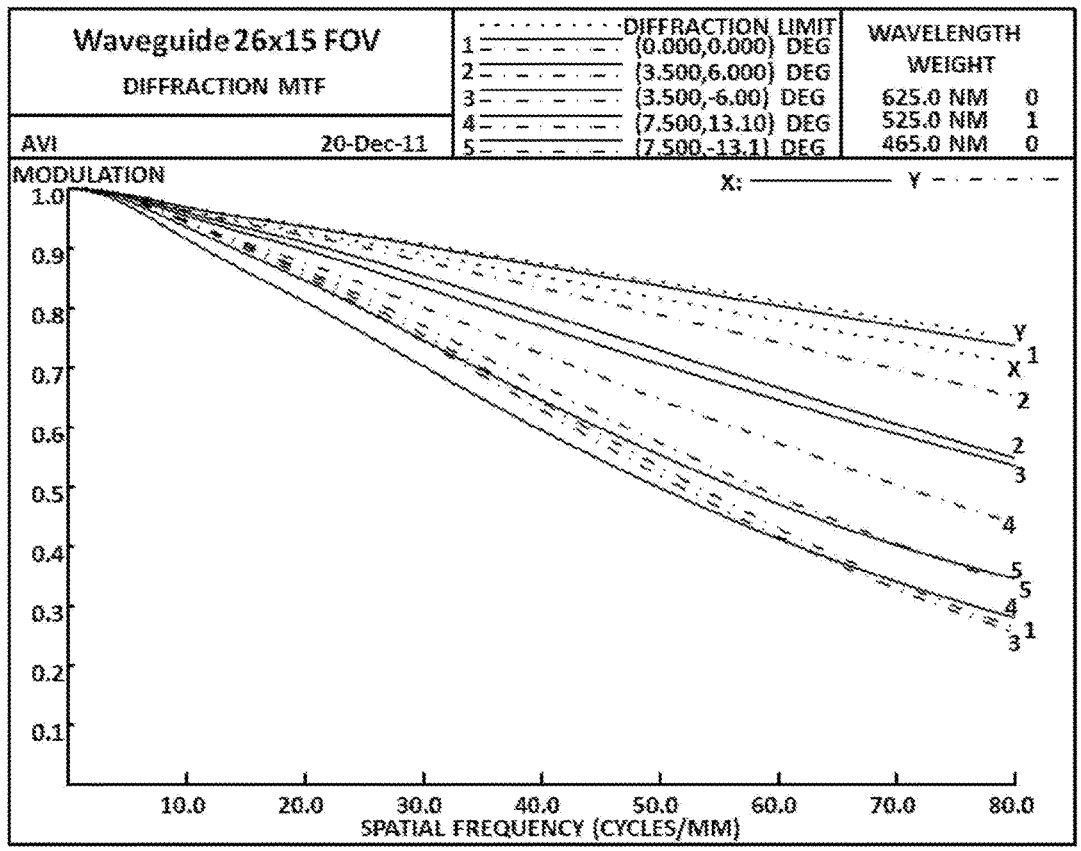
Figure 12:
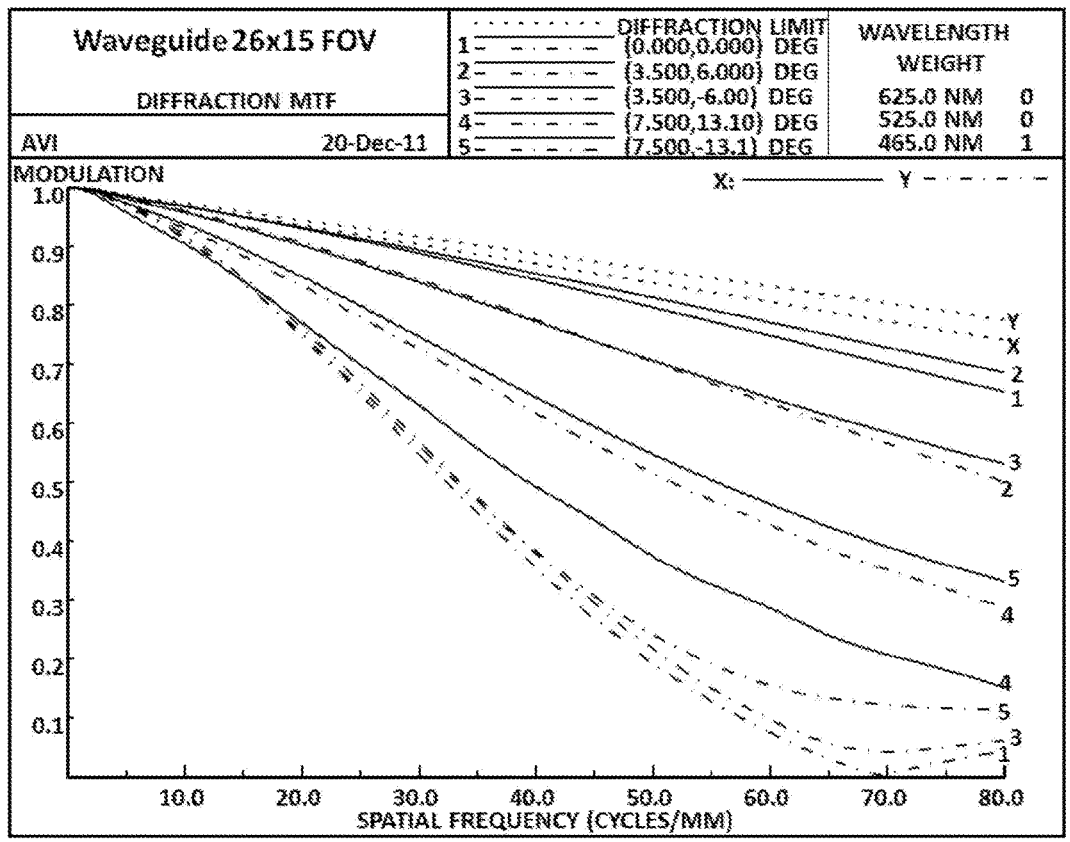

The MTF plots of selected fields for Red (625 nm), Green (525 nm), and Blue (465 nm) wavelengths are shown in FIG. 12. The. MTF performance was evaluated for a centered 3-mm pupil at a cutoff spatial frequency of 80 cycles/mm, which corresponds to an equivalent pixel size of 6.25 μm.

Numerical Data for Embodiment 6 (described in FIG. 9)

FIG. 13 shows the notation and element definition for embodiment 6 (FIG. 9). The embodiment is designed for a 0.37" reflective-type display (for instance LCoS or FLCoS), yielding a virtual FOV of 26.5° in Y direction and 15° in X direction, and 30° diagonally. The system F/number is 2. FIG. 28 (Table 5) lists the surface parameters for the waveguide prism 900 and FIG. 29 (Table 6) lists the surface parameters for the coupling lens 910 and field lens 905b. The position and orientation of all the optical surfaces, as well as the optical material for each optical element are listed in FIG. 30 (Table 7).

Figure 14:
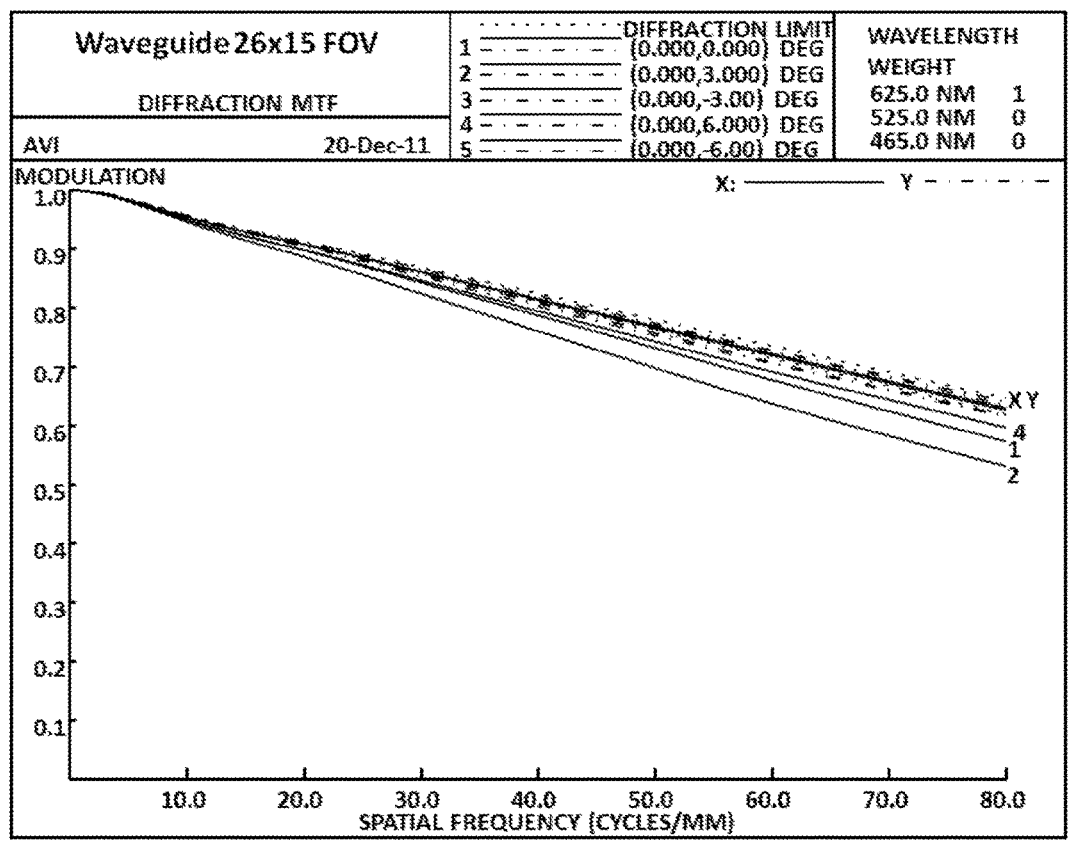
FIG. 14 shows the MTF plots of the selected fields for Red (625 nm), Green (525 nm), and Blue (465 nm) wavelengths for the embodiment 6.
Figure 14:
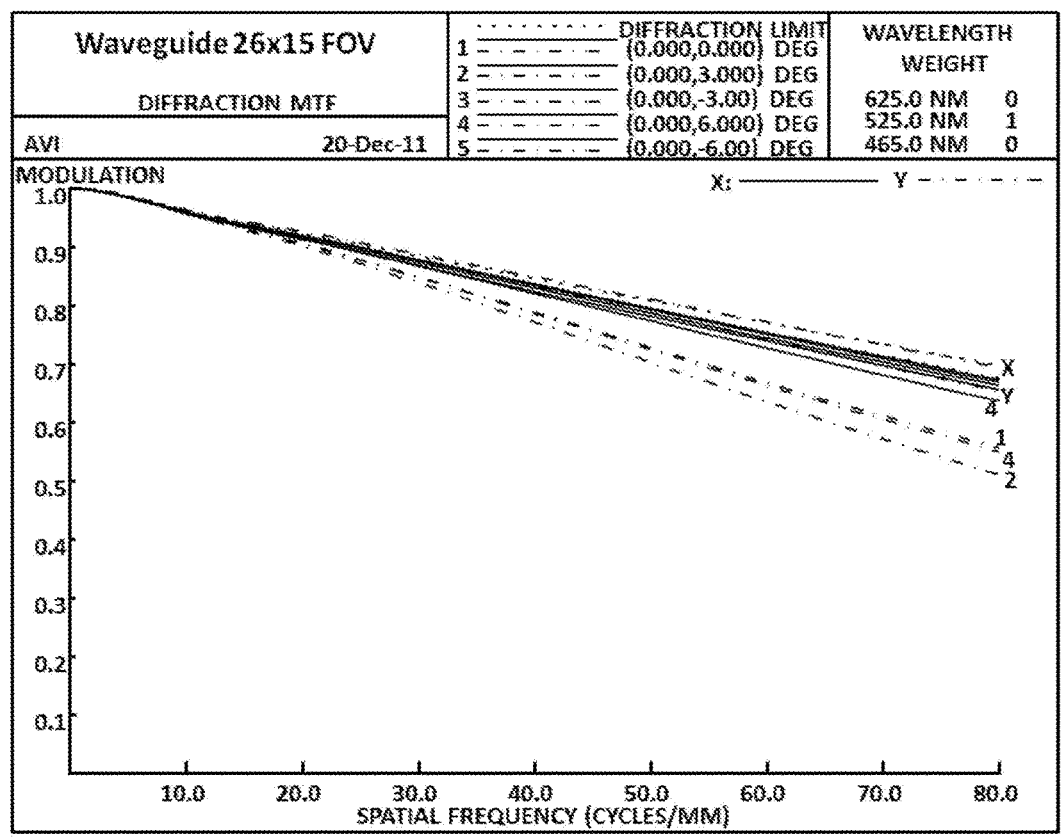
Figure 14:
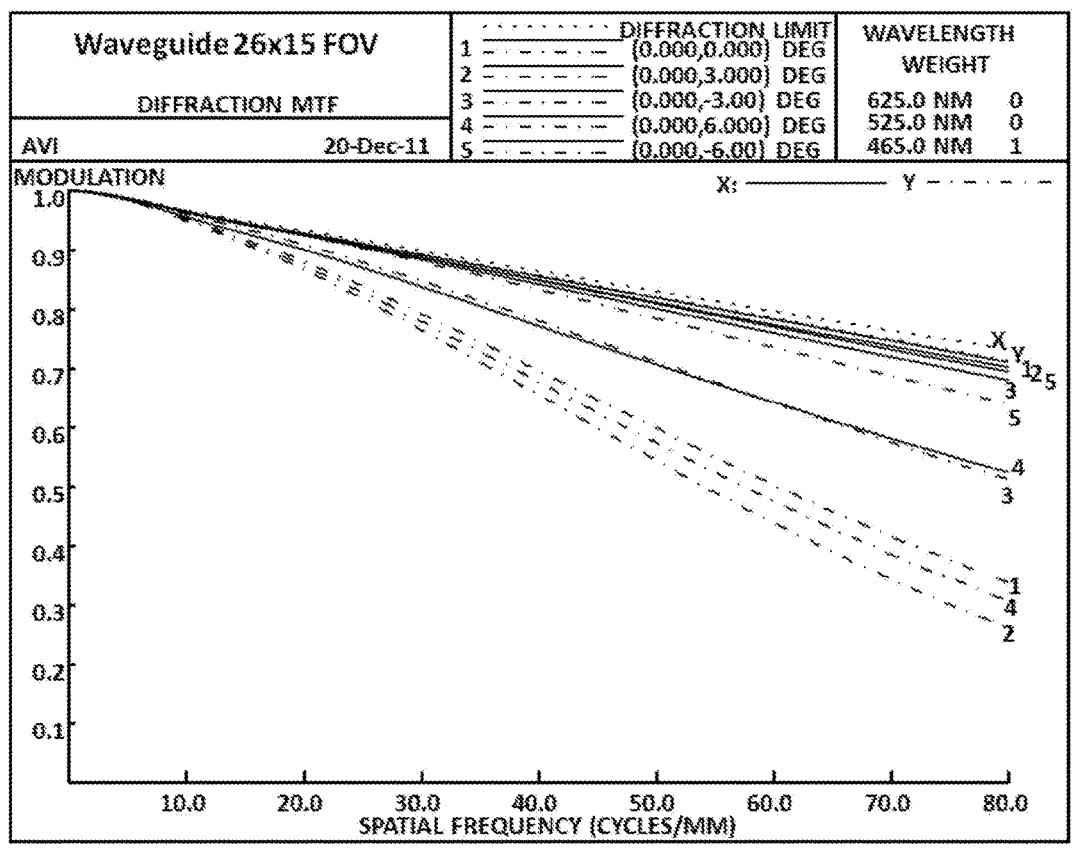

The MTF plots of selected fields for Red (625 nm), Green (525 nm), and Blue (465 nm) wavelengths are shown in FIG. 14. The MTF performance was evaluated for a centered 3-mm pupil at a cutoff spatial frequency of 80 cycles/mm, which corresponds to an equivalent pixel size of 6.25 μm.

Figure 15:
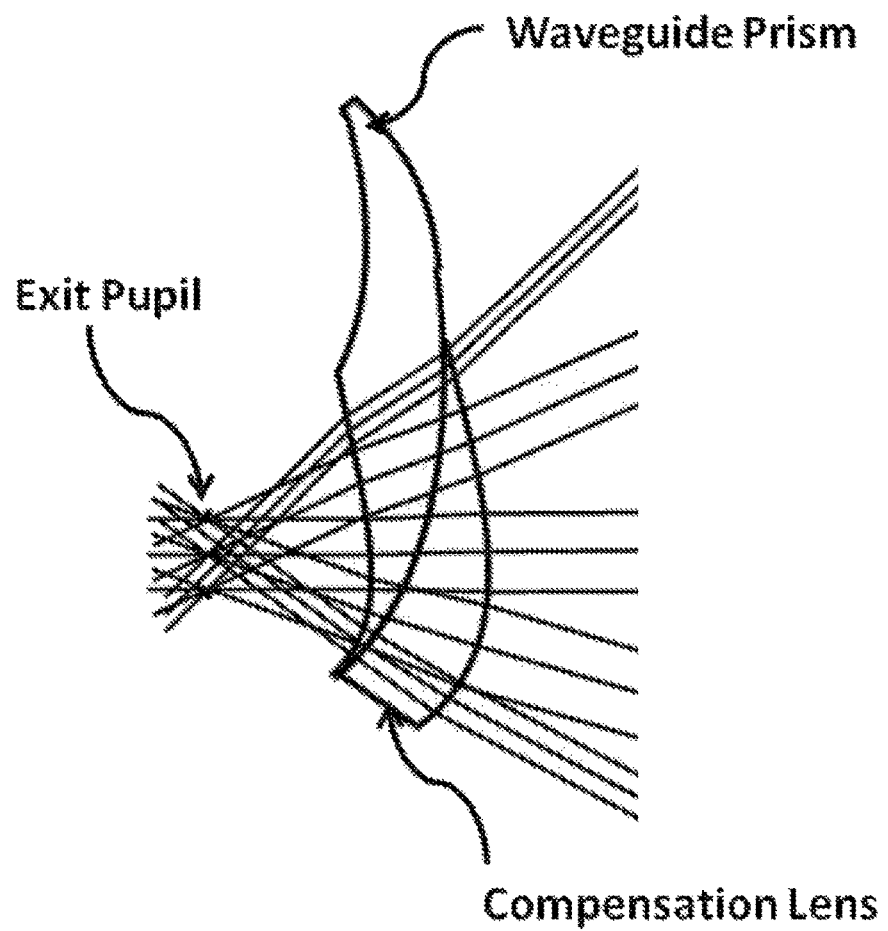
FIG. 15 shows a ray tracing example of the see-through path for embodiment 6.

FIG. 15 shows a ray-tracing example of the see-through path for the embodiment 6. The overall corrected see-through FOV is 75° in the horizontal direction and 70° in the vertical direction.

Figure 16:
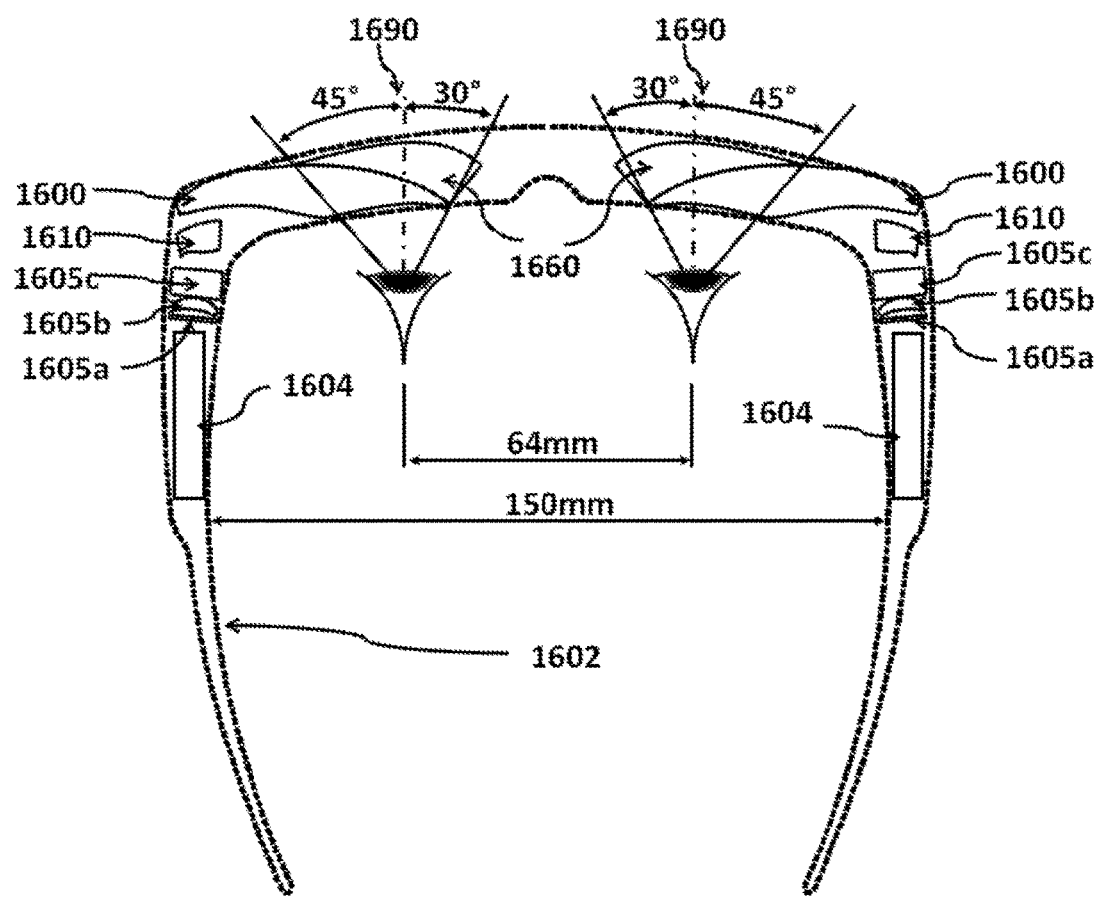
FIG. 16 shows an illustrative OST-HMD design with a 4-base curve appearance according to the embodiment 6 of the present invention.

FIG. 16 shows an illustrative OST-HMD design with a 4-base curve appearance according to the embodiment 6 of the present invention. The OST-HMD device contains a pair of optical assembly of the embodiment 6, a frame 1602, and an electronics unit 1604. Each optical assembly contains the freeform waveguide prism 1600, compensation lens 1660, coupling lens 1610, beam splitter 1605c, field lens 1605b, and a micro-display panel 1605a. The electronics unit 1604 inside the two arms of the frame 1602 can be used to integrate the necessary electronics, which include but not limited to, circuit boards for the micro-display unit and display illumination unit, image and video receiving and processing unit, audio input and output unit, graphic processing unit, positioning unit, wireless communication unit, and computing processing unit, etc. The designated see-through FOV 1690 of this embodiment is 45° on temple side and 30° on nasal side in the horizontal dimension and ±35° in the vertical dimension (not shown).

Numerical Data for Embodiment 7 (described in FIG. 10)

FIG. 17 shows the notation and element definition for embodiment 7 (FIG. 10). The embodiment is designed for a 0.37" reflective-type display (for instance LCoS or FLCoS), yielding a virtual FOV of 26.5° in Y direction and 15° in X direction, and 30° diagonally. The system F/number is 2. FIG. 31 (Table 8) lists the surface parameters for the waveguide prism 1000 and FIG. 32 (Table 9) lists the surface parameters for the coupling lens 1010 and field lens 1005b. The position and orientation of all the optical surfaces as well as the optical material for each optical element are listed in FIG. 33 (Table 10).

Figure 18:
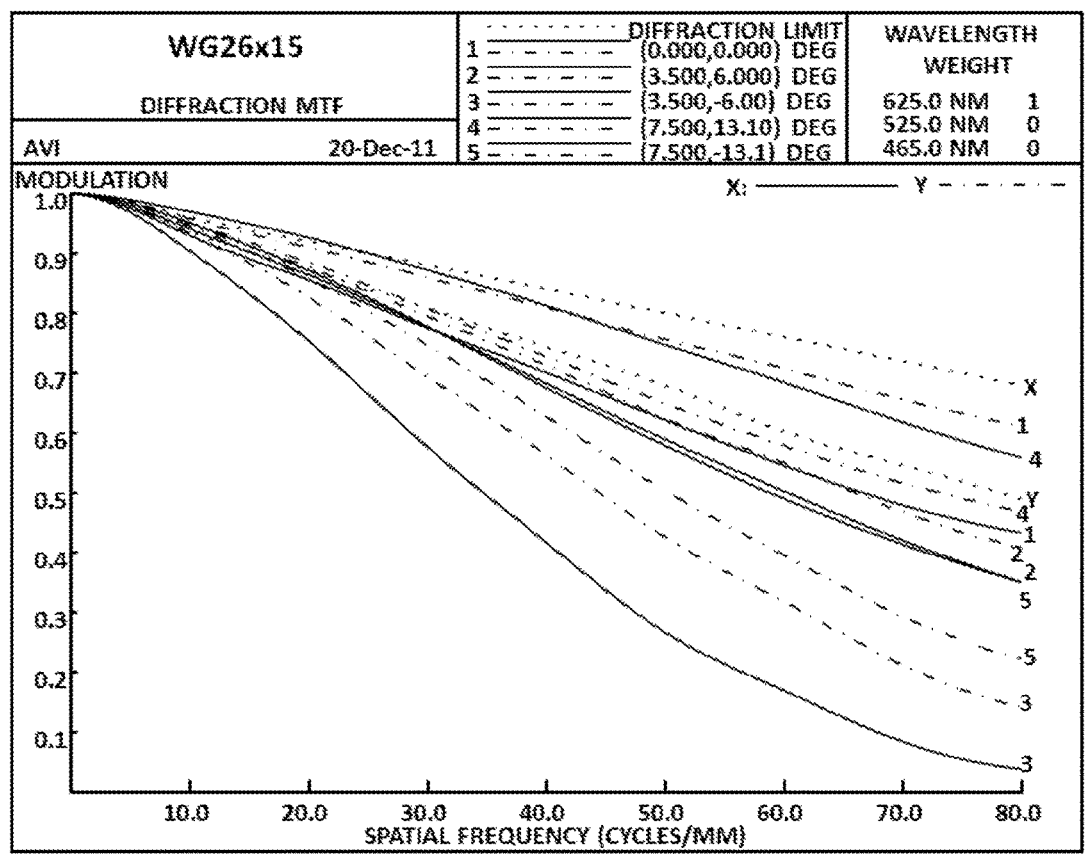
FIG. 18 shows the MTF plots of the selected fields for Red, (625 nm), Green (525 nm), and Blue (465 nm) wavelengths for the embodiment 7.
Figure 18:
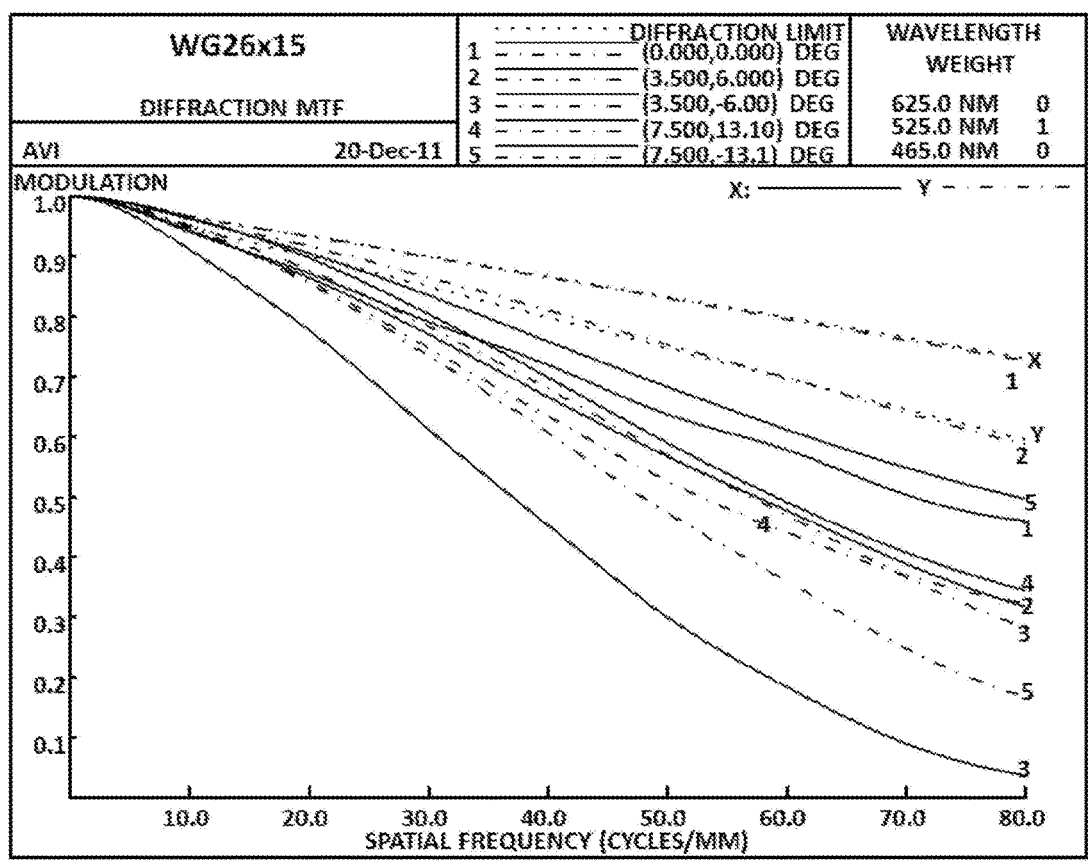
Figure 18:
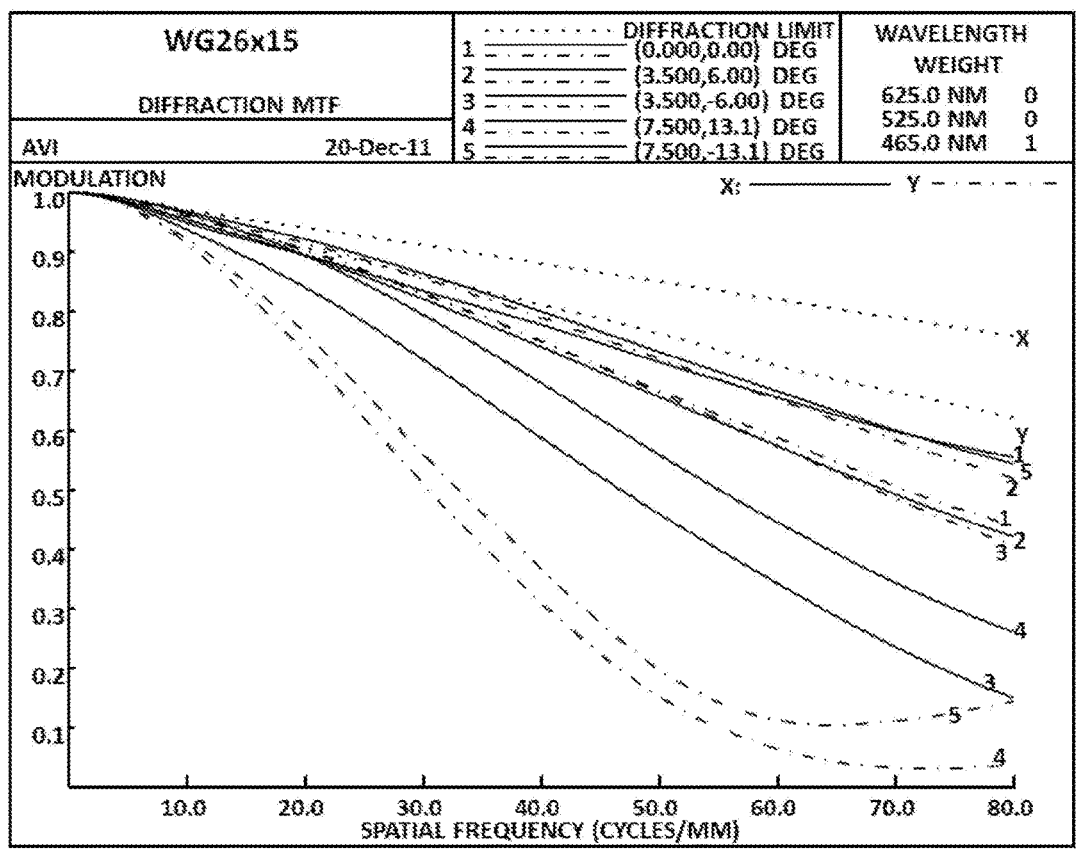

The MTF plots of selected fields for Red (625 nm), Green (525 nm), and Blue (465 nm) wavelengths are shown in FIG. 18. The MTF performance was evaluated for a centered 3-mm pupil at a cutoff spatial frequency of 80 cycles/mm, which corresponds to an equivalent pixel size of 6.25 μm.

Figure 19:
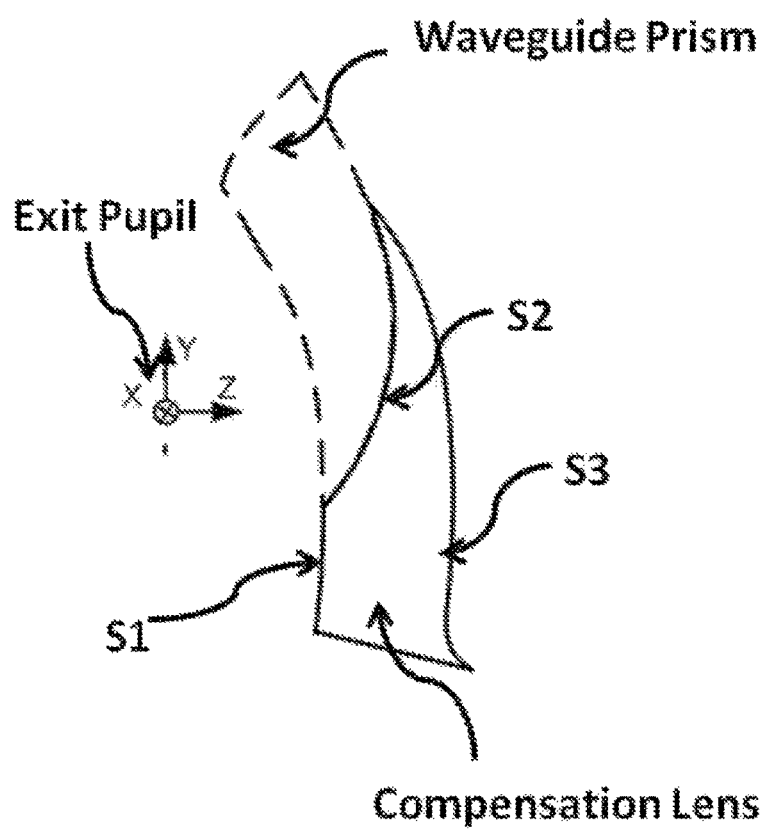
FIG. 19 shows the notation and element definition of the compensation lens for the embodiment 7 shown in FIG. 10.

FIG. 19 shows the notation and element definition for the compensation lens of embodiment 7 (FIG. 10).

Figure 20:
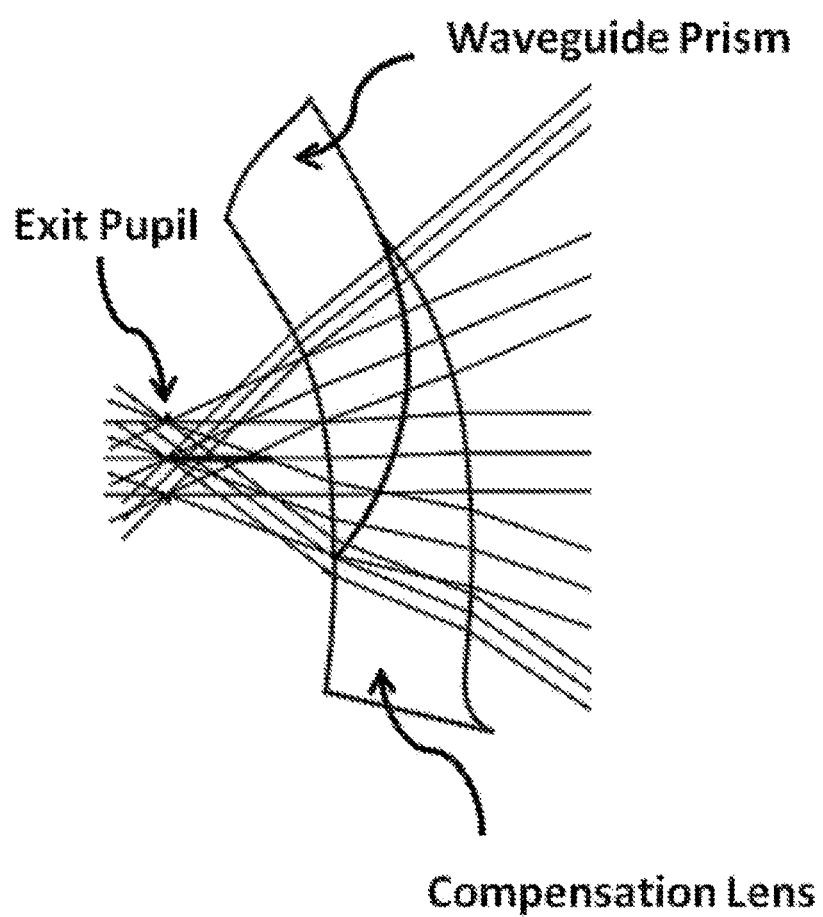
FIG. 20 shows a ray tracing example of the see-through path for the embodiment 7 shown in FIG. 10.

FIG. 20 shows a ray-tracing example of the see-through path for the embodiment 6. The overall corrected see-through FOV is 80° in the horizontal direction and 70° in the vertical direction.

Figure 21:
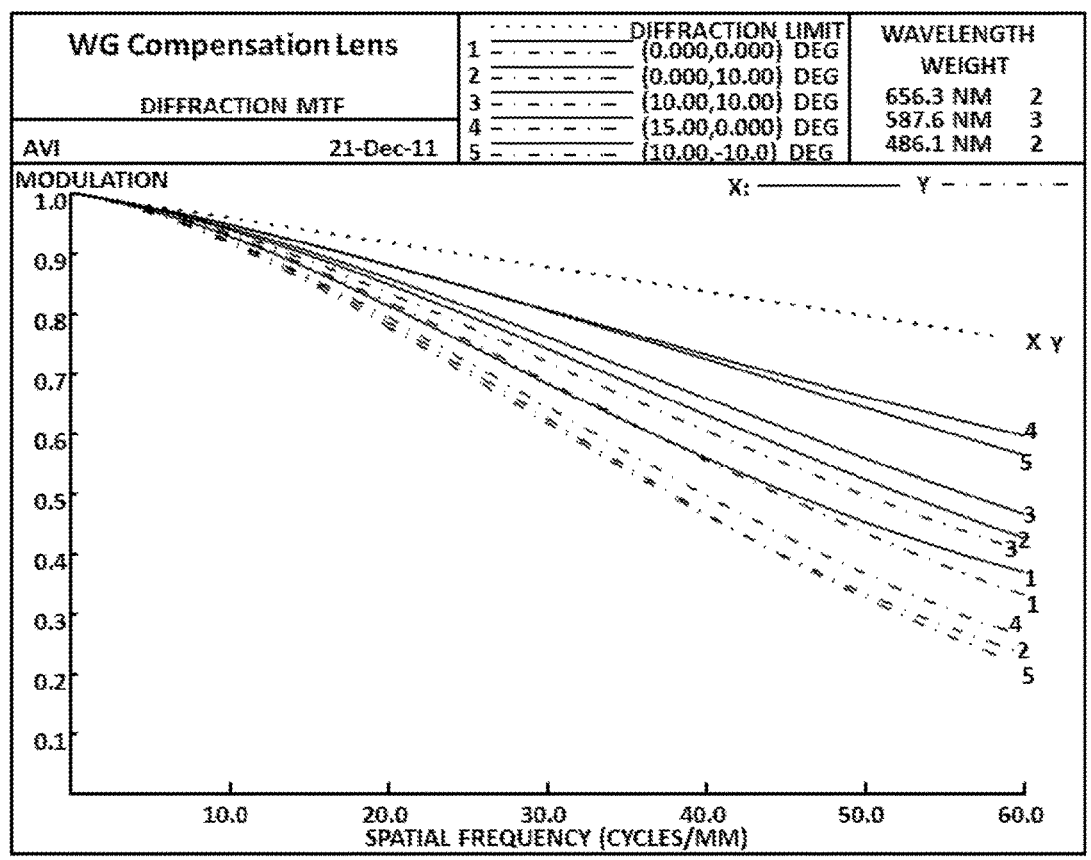
FIG. 21 shows Polychromatic MTF plots of selected fields for the see-through path for the embodiment 7 shown in FIG. 10.
Figure 21:
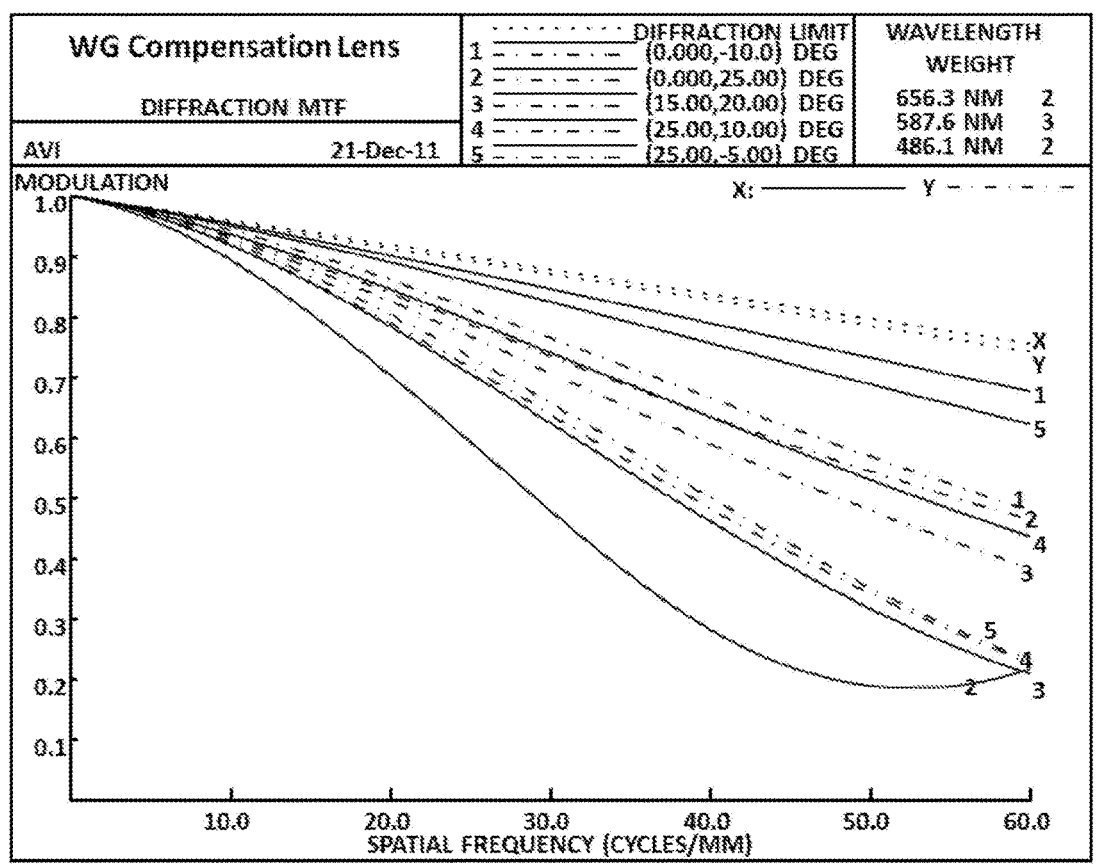
Figure 21:
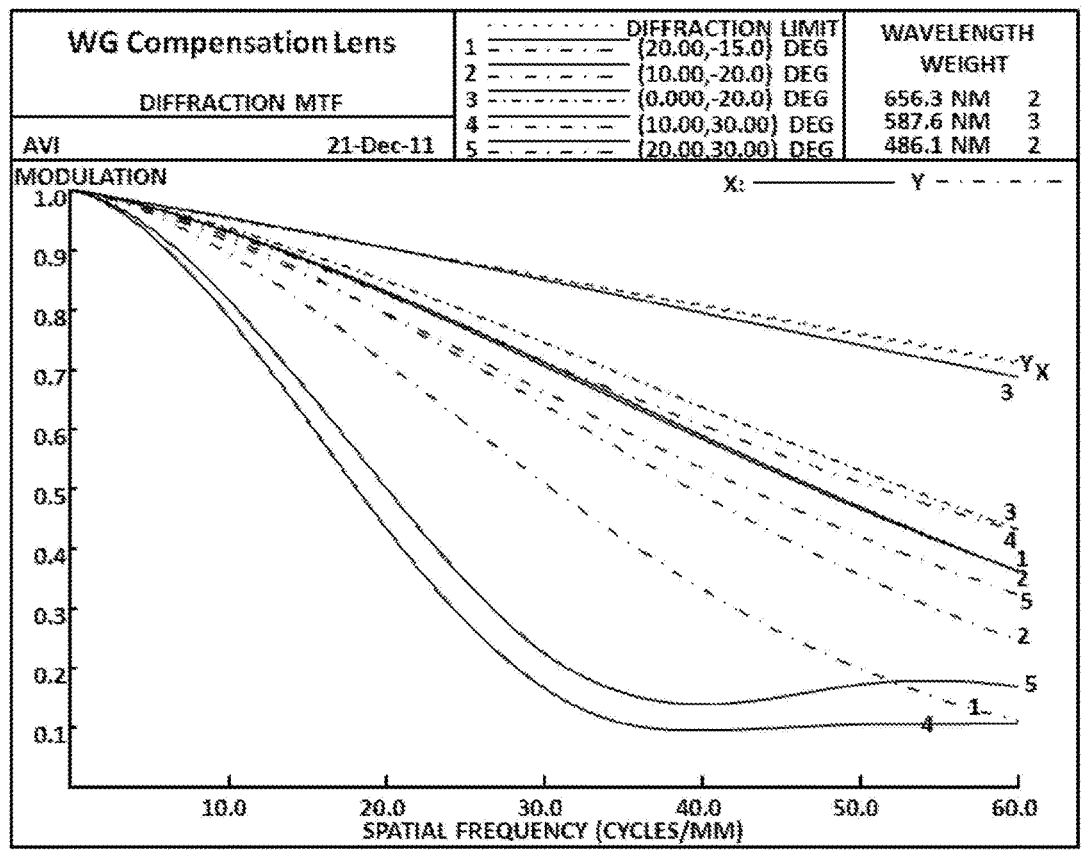

The polychromatic MTF plots of the selected fields for the see-through path are shown in FIG. 21. The MTF performance was evaluated for a centered 3-mm pupil at a cutoff spatial frequency of 60 cycles/mm.

Figure 22:
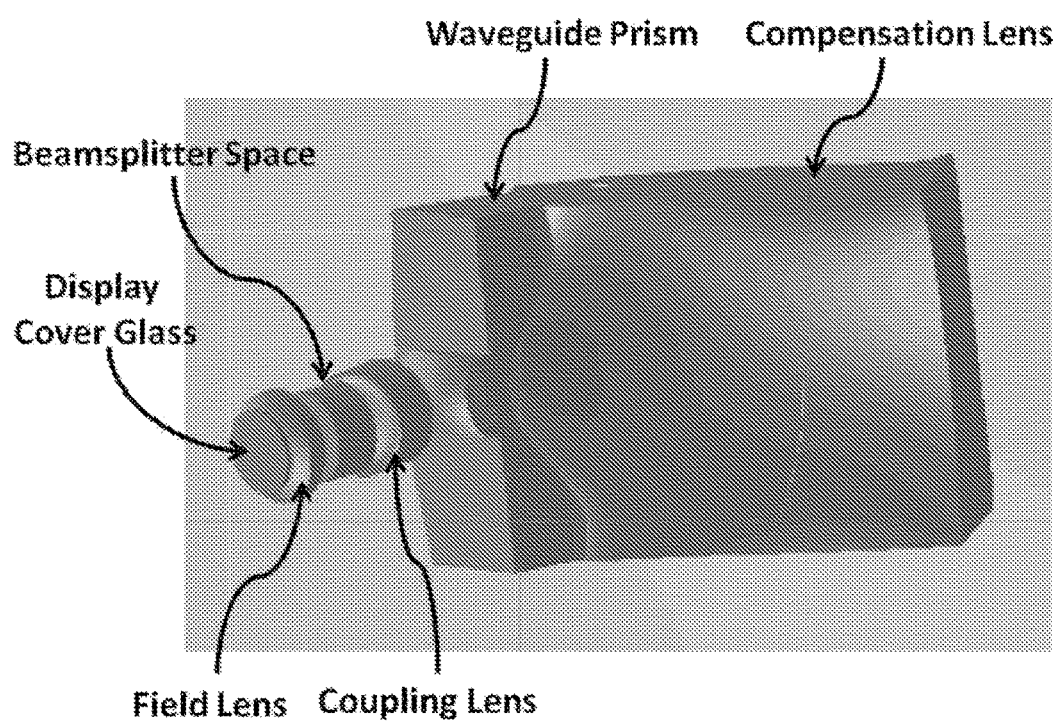
FIG. 22 shows an untrimmed 3D model of the embodiment 7 of the present invention.

FIG. 22 shows an untrimmed 3D model of the embodiment 7. The model contains the waveguide prism, compensation lens, coupling lens, and field lens. The model also includes a beam splitter space to provide room for inserting a beam splitter to introduce an illumination path for a reflective-type micro-display. The model further includes a cover glass for the micro-display.

Figure 23:
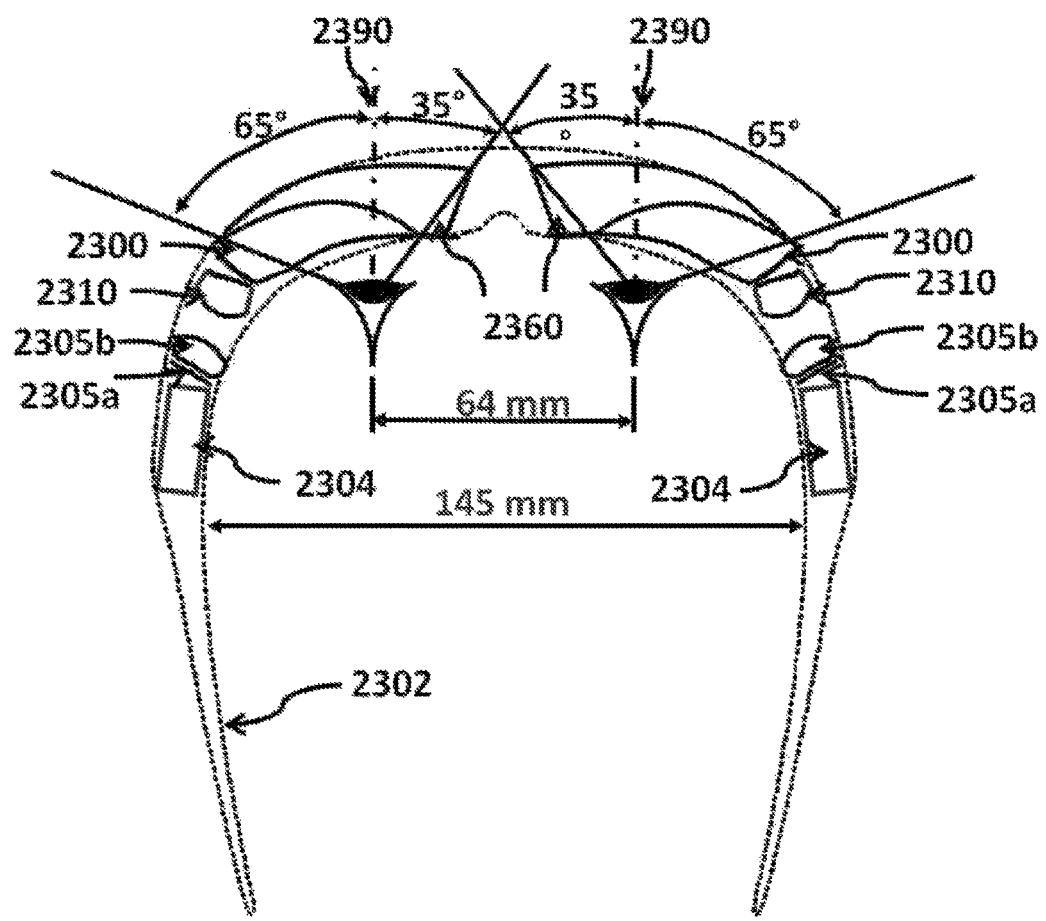
FIG. 23 shows an illustrative OST-HMD design with an 8-base curve wraparound appearance according to the embodiment 7 of the present invention.

FIG. 23 shows an illustrative OST-HMD design with an 8-base curve appearance according to the embodiment 7 of the present invention. The OST-HMD device contains a pair of optical assembly of the embodiment 7, a frame 2302, and an electronics unit 2304. Each optical assembly contains the freeform waveguide prism 2300, compensation lens 2360, coupling lens 2310, field lens 2305b, and a micro-display panel 2305a. The electronics unit 2304 inside the two arms of the frame 2302 can be used to integrate the necessary electronics, which include but not limited to, circuit boards for the micro-display unit and display illumination unit, image and video receiving and processing unit, audio input and output unit, graphic processing unit, positioning unit, wireless communication unit, and computing processing unit, etc. The designated see-through FOV 2390 of this embodiment is 65° on temple side and 35° on nasal side in the horizontal dimension and ±35° in the vertical dimension (not shown).

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An image display system which projects displayed virtual image into a pupil of a user through a waveguide prism, allowing the user to see displayed content overlaid upon a real world scene, where the system has a wide see-through field of view, of up to 90° in the temple direction, up to 60° in the nasal direction, and up to 60° above and below a straight-ahead view, and where the system fits into the shape of an eyeglass form factor, the system comprising:
   a. An image display unit 105, disposed towards the temple side of a users head, which projects light into a waveguide, where the image display unit is constrained to be outside of a reference curved surface defined by the shape of an average human head;
   b. an optional coupling lens group 110, disposed between the image display unit and a waveguide, composed of one or more lenses, which guide light from the image display unit 105 into the waveguide 100 and corrects for optical aberration;
   c. a transparent optical waveguide prism 100, which accepts the light from the image display unit and propagates the light until the, image is projected into the field of view of the user; where the waveguide has. a physical inner surface 115, physical edge surface 120 and physical outer surface 125, a first refractive surface 130, and a second refractive surface 135, and a plurality of reflective surfaces, where the waveguide has a shape that fits into an eyeglass form factor and has a wide see-through field of view of up to 90° in the temple direction, up to 60° in the nasal direction, and up to 60° above and below a straight-ahead view;
   d. a compensation lens 160, secured to the physical outer surface 125 of the waveguide 100, which corrects for optical distortion caused by viewing the world through the waveguide prism; where the inner surface of the compensation lens 165 approximates the shape of the outer surface 125 of the waveguide; where a small air gap 195 is maintained between the compensation lens and the waveguide on surfaces where the total internal reflection criterion is satisfied for the outer surface 125 of the waveguide;
   whereupon the image display unit 105 transmits light 140 into the optional coupling lens 110 followed by the waveguide 100, or into the waveguide directly, through a first refractive surface 130;
   whereupon the light 140 follows a path 145 along the waveguide that comprises a plurality of reflections from the first refractive surface 130 to the second refractive surface 135;
   whereupon light 140 passes through the second refractive surface 135 beyond which where the user places his or her pupil 150 to view the image;
   whereupon light 198 from the real-world scene passes through the compensation lens 160 and the waveguide 100 before reaching the pupil 150, where the see-through field of view of the real-world scene is up to 90° in the temple direction, up to 60° in the nasal direction, and up to 60° above and below a straight-ahead view.

2. The apparatus of claim 1, where the waveguide 100 and compensation lens 160 surfaces are jointly optimized for, a maximum see through field of view with a minimum of distortion, under the constraint that the total thickness of the waveguide 100 and compensation lens 160 be no more than a maximum thickness, and the size of the air gap 195 be no more than a maximum thickness, and the waveguide 100 have a width from the pupil to the temple greater than 25 mm.

3. The apparatus of claim 1, where the maximum thickness constraint of the joint waveguide and compensation lens is 40 mm and the maximum thickness of the air gap is 6 mm.

4. The apparatus of any one of claims 1-3 where an index matching glue is used, between the outer physical surface of the waveguide 125 and the inner surface 165 of the compensation lens, on portions of the waveguide outer surface 125 where the total internal reflection criterion is not used to produce a reflection, to cement the compensation lens 160 to the waveguide 100, and where an air gap 195 is otherwise maintained.

5. The apparatus of claim 1, where the image display unit 405 is disposed facing the waveguide first refractive surface 430, which lies on an edge surface of the waveguide, where there is a coupling lens 410 between the image display unit and the waveguide prism 400 which corrects for optical aberration and improves the image quality; where the image display unit 405 emits ray bundles 440*a* 440*b* 440*c* which enter the waveguide through a First refractive surface 430, are reflected five times by the reflective surfaces before exiting through a second refractive surface 435, before reaching the user's pupil 450.

6. The apparatus of claim 1, where the image display unit 505 is disposed facing the inner surface of the waveguide, where the image display unit emits three ray bundles 540*a* 540*b* 540*c* which enters the first inner refractive surface 530 of the waveguide, where the rays are reflected five times by the reflective surfaces (R1-5); before reaching the exit pupil 550 where they comprise a virtual image, where there is a coupling lens 510 between the image display unit and the waveguide prism which corrects for optical aberration and improves the image quality.

7. The apparatus of claim 1, where there is a coupling lens 610 between the image display unit 605 and the waveguide prism 600 which corrects for optical aberration and improves the, image quality.

8. The apparatus of claim 1, where the image display unit 105 is based on a reflective-type illuminated pixel array selected from the group consisting of Liquid Crystal on Silicon (LCOS) microdisplay technology and Ferroelectric Liquid Crystal on Silicon (FLCoS), and where the image display unit 805 comprises:
   a. A reflective-type illuminated pixel array micro-display panel 805*a*
   b. A field lens 805*b*
   c. A polarized beam splitter 805*c*
   where the field lens 805*b* enforces telecentricity of light on the display surface,
   where the beam splitter 806*c* acts as a beam combiner to merge the illumination light path.

* * * * *